(12) United States Patent
Penn et al.

(10) Patent No.: US 7,974,676 B2
(45) Date of Patent: Jul. 5, 2011

(54) METHOD AND SYSTEM FOR DISCRIMINATING IMAGE REPRESENTATIONS OF CLASSES OF OBJECTS

(75) Inventors: Alan Penn, Rockville, MD (US); Scott F. Thompson, Vienna, VA (US)

(73) Assignee: Alan Penn & Associates, Inc., Rockville, MD (US)

( * ) Notice: Subject to any disclaimer, the term of this patent is extended or adjusted under 35 U.S.C. 154(b) by 483 days.

(21) Appl. No.: 11/660,550

(22) PCT Filed: May 3, 2005

(86) PCT No.: PCT/US2005/015326
§ 371 (c)(1), (2), (4) Date: Oct. 7, 2008

(87) PCT Pub. No.: WO2006/022916
PCT Pub. Date: Mar. 2, 2006

(65) Prior Publication Data
US 2009/0060297 A1    Mar. 5, 2009

Related U.S. Application Data

(60) Provisional application No. 60/601,981, filed on Aug. 17, 2004, provisional application No. 60/647,756, filed on Jan. 31, 2005.

(51) Int. Cl.
*A61B 5/05* (2006.01)
*G06K 9/00* (2006.01)

(52) U.S. Cl. .......................... 600/407; 382/128; 128/920

(58) Field of Classification Search ................... 600/407; 382/128; 128/920
See application file for complete search history.

(56) References Cited

U.S. PATENT DOCUMENTS

| | | | |
|---|---|---|---|
| 4,907,156 A | 3/1990 | Doi et al. | |
| 5,133,020 A | 7/1992 | Giger et al. | |
| 5,881,124 A | 3/1999 | Giger et al. | |
| 5,986,662 A | 11/1999 | Argiro et al. | |
| 5,987,345 A | 11/1999 | Engelmann et al. | |
| 6,169,817 B1 | 1/2001 | Parker et al. | |
| 6,282,305 B1 | 8/2001 | Huo et al. | |
| 6,309,353 B1 | 10/2001 | Cheng et al. | |
| 6,317,617 B1 | 11/2001 | Gilhuijs et al. | |
| 6,353,803 B1 | 3/2002 | Degani | |
| 6,553,327 B2 | 4/2003 | Degani | |
| 6,553,356 B1 | 4/2003 | Good et al. | |
| 6,556,699 B2 | 4/2003 | Rogers et al. | |
| 6,650,766 B1 | 11/2003 | Rogers et al. | |
| 6,671,540 B1 | 12/2003 | Hochman | |
| 6,674,880 B1 | 1/2004 | Stork et al. | |
| 6,697,506 B1 | 2/2004 | Qian et al. | |
| 6,747,665 B1 | 6/2004 | Stoval, III et al. | |
| 6,801,645 B1 | 10/2004 | Collins et al. | |
| 6,901,156 B2 | 5/2005 | Giger et al. | |
| 6,909,797 B2 | 6/2005 | Romsdahl et al. | |
| 6,925,200 B2 | 8/2005 | Wood et al. | |

OTHER PUBLICATIONS

D. R. Fischer et al., "Is the "blooming sign" a promising additional tool to determine malignancy in MR mammography?", Eur. Radiol., vol. 14, pp. 394-401, 2004.

*Primary Examiner* — Long V Le
*Assistant Examiner* — Michael T Rozanski
(74) *Attorney, Agent, or Firm* — Browdy and Neimark, PLLC

(57) ABSTRACT

A method of identifying the location of a lesion in an image and evaluating whether the identified lesion is more likely to be cancerous, benign or uncertain is provided where the image includes a plurality of pixels, each pixel having a particular intensity I in the range of $0 < I < 2 < sup$.

48 Claims, 14 Drawing Sheets

FIG. 9

METHOD AND SYSTEM FOR DISCRIMINATING IMAGE REPRESENTATIONS OF CLASSES OF OBJECTS

CROSS-REFERENCE TO RELATED APPLICATIONS

This application claims the benefit of U.S. Provisional Applications Nos. 60/601,981, filed on Aug. 17, 2004, and 60/647,756, filed on Jan. 31, 2005.

This work was supported in part by at least one grant R44CA85101 issued by the National Cancer Institute (NCI). The government may have certain rights in this invention.

COMPUTER PROGRAM LISTING APPENDIX SUBMITTED ON A COMPACT DISC

Submitted herewith are two identical, or duplicate, compact discs. The material on these compact discs is incorporated herein by reference. Each of these identical compact discs contains the following files:

| File | Date Created | Size | Description |
| --- | --- | --- | --- |
| LevelSetMapper.java | Jan. 14, 2005 | 10195 | Java source code. Main entry point for algorithm. Sets parameters for algorithm, loads image data into memory, and calls methods in LevelSetFinder. |
| LevelSetFinder.java | Jan. 4, 2005 | 4844 | Java source code. Initializes components for the computation of intensity steps. Calls methods in LevelSetHelper. |
| LevelSetHelper.java | Jan. 4, 2005 | 27314 | Java source code. Contains main algorithm and methodology details. Calls methods in ClusterMap5 and BasicSegmenter for connected component analysis and segmentation of cluster. |
| ClusterMap5.java | Jan. 4, 2005 | 43293 | Java source code. Contains supplemental algorithms for connect component analysis. |
| BasicSegmenter.java | Oct. 9, 2003 | 2442 | Java source code. Contains supplemental algorithms for segmenting the image. |
| SegmentationBuffer.java | Oct. 9, 2003 | 21313 | Java source code. Work-horse for BasicSegmentation. |
| ClusterDispersion.java | Apr. 19, 2005 | 1473 | Java source code. Computes an adjustment to intensity step values based on cluster dispersion. |
| ClusterCondition.java | Mar. 23, 2005 | 1207 | Java source code. Describes the cluster attributes and conditions upon which a cluster is removed from consideration. |
| Lsv_params.xml | Mar. 23, 2005 | 815 | Input parameters that control various aspects of the algorithm. |

BACKGROUND OF THE INVENTION

1. Field of Invention

The present invention relates to a method, procedure, and set of computer codes for discriminating image representations of classes of objects, such as MRI signals of benign and malignant lesions, where the images have been transformed to meet constraints of the system, e.g., windowing/leveling to display a lesion in the center of a range of displayed intensities.

2. Prior Art

In many prior applications, data are represented in three dimensions where two of the dimensions (x,y) represent spatial location on a grid of fixed size and the third dimension (w) is a representation of original source data. As an example, in magnetic resonance imaging (MRI) systems, the w dimension is image intensity, which represents signal strength from the imaging system. In the MRI example, the source signal is transformed to an image intensity signal to show a medically appropriate representation of the MRI image data in a way that satisfies limitations in intensity values imposed by the display system, e.g. $2^8=256$ discrete intensity levels. Linear transformations on the w-axis, such as windowing and leveling, are typically used to show the medically relevant portions of the image in the central portion of the displayed intensity scale. In many of these applications, the end-user could benefit from being able to distinguish and discriminate objects (e.g., lesions) within the source data on the basis of the original signal strength. However, the transformations from source signal to image intensity signal, which may vary from case to case, make this comparative analysis difficult and subject to error. In other applications data are represented in 4 dimensions, where 3 of the dimensions represent spatial location (x,y,z) and the fourth dimension (w) is a representation of the source data. All discussions and descriptions for the invention in 2 spatial dimensions are readily extended to 3 spatial dimensions. While the term pixel is frequently used to refer to 2-dimensions and the term voxel is frequently used to refer to 3-dimensions, in this application we use pixel to refer to 2-dimensions and 3-dimensions.

In the example of medical MRI, the source signals from gadolinium-enhanced images of malignant lesions are frequently stronger than the source signals from gadolinium enhanced images of benign lesions. However, after the source data have been transformed to image intensities that have been adjusted to optimize medical diagnosis, where this optimization differs from case to case, it is difficult for the radiologist to evaluate the strength of the original magnetic resonance signal on the basis of the images that are presented.

An object of the present invention is to provide a system, method and computer program product for evaluating whether a lesion in an image is cancerous, benign, or of an uncertain nature based on the intensities of the pixels in the image.

It is a further object of the present invention to provide a system, method and computer program product for evaluating a lesion which can discriminate classes of objects based on intensity and spatial relationships of pixels, e.g., gradients and shapes within or near the objects.

It is a further object of the present invention to provide a system, method and computer program product to allow a radiologist to evaluate the strength of the original image signal after the source data have been transformed to image intensities that have been adjusted to optimize medical diagnosis.

A further object is to simultaneously obtain diagnostic information from a substantial portion of a patient's body, possibly presenting multiple lesions.

Another object is to obtain highly reliable diagnostic information based on image data obtained from images corresponding to one, or at most two, time frames.

The scope and content of the present invention is not intended to be limited by or to the above mentioned objects.

The invention provides a novel method of evaluating images of a body region, wherein at least one of the images shows an abnormality indicative of a possible lesion, comprising the steps of:

determining locations of pixels in each image that show such abnormality;

for each of a set of intensity levels, I, determining a contour around the cluster containing the pixels at the locations determined in the step of determining;

defining a function, F, that discriminates a distinct characteristic of each contour in a nested sequence;

defining a function, G, used to characterize the changes in the value of the function F over the range of contours at each intensity level; and identifying a lesion as being more likely to be benign or more likely to be cancerous based on at least one threshold value for the function G or based on threshold values and locations of pixels depicting a plurality of lesions within the body region.

Briefly, the invention is characterized in particular by the use of a method of evaluating whether a lesion in an image is cancerous, benign or uncertain, where the image includes a plurality of pixels, each pixel having a particular intensity I in the range of $0 \leq I < 2^N$, where N is an integer >1. One embodiment of the method includes the steps of defining a landmark pixel within the lesion in the image, growing a cluster around the landmark pixel which contains the lesion for each intensity value in a set of possible intensity values; and at each intensity level in the set, constructing a region of interest such that the region of interest is a minimal polygon containing the cluster at that intensity level. The method further includes the steps of computing a value of a characteristic of the minimal polygon at each intensity level in the set, determining a number related to changes in the characteristic values over the range of intensity levels, and determining whether the lesion is more likely to be cancerous, benign or uncertain in response to the number related to changes in the characteristic values over the range of intensity levels.

An evaluation process according to the invention may typically start with a number of images of different body region slices. A preliminary manual or automated operation may be carried out to exclude from further processing those images that do not show evidence of a lesion.

For example, all images could be examined visually and only those images that appear to show an abnormality or abnormality could then be evaluated according to the invention.

Alternatively, all images could be evaluated according to the invention and those images for which the evaluation indicates that no lesion is present could be discarded. For example, images could be discarded if there is no evidence of an abnormality, or if evaluations of each area of interest, or abnormality, in an image generate a number of changes in the size of the image contour that is below a certain threshold value. That value could be selected on the basis of experience, but would be expected to be in the range of 3 to 5.

BRIEF DESCRIPTION OF THE DRAWINGS

For better understanding of the invention and additional objects and advantages thereof, reference is made to the following detailed description and accompanying drawing of a preferred embodiment, wherein

FIG. 9 is a replica of a presentation illustrating various features and advantages of the invention.

Figure 9:
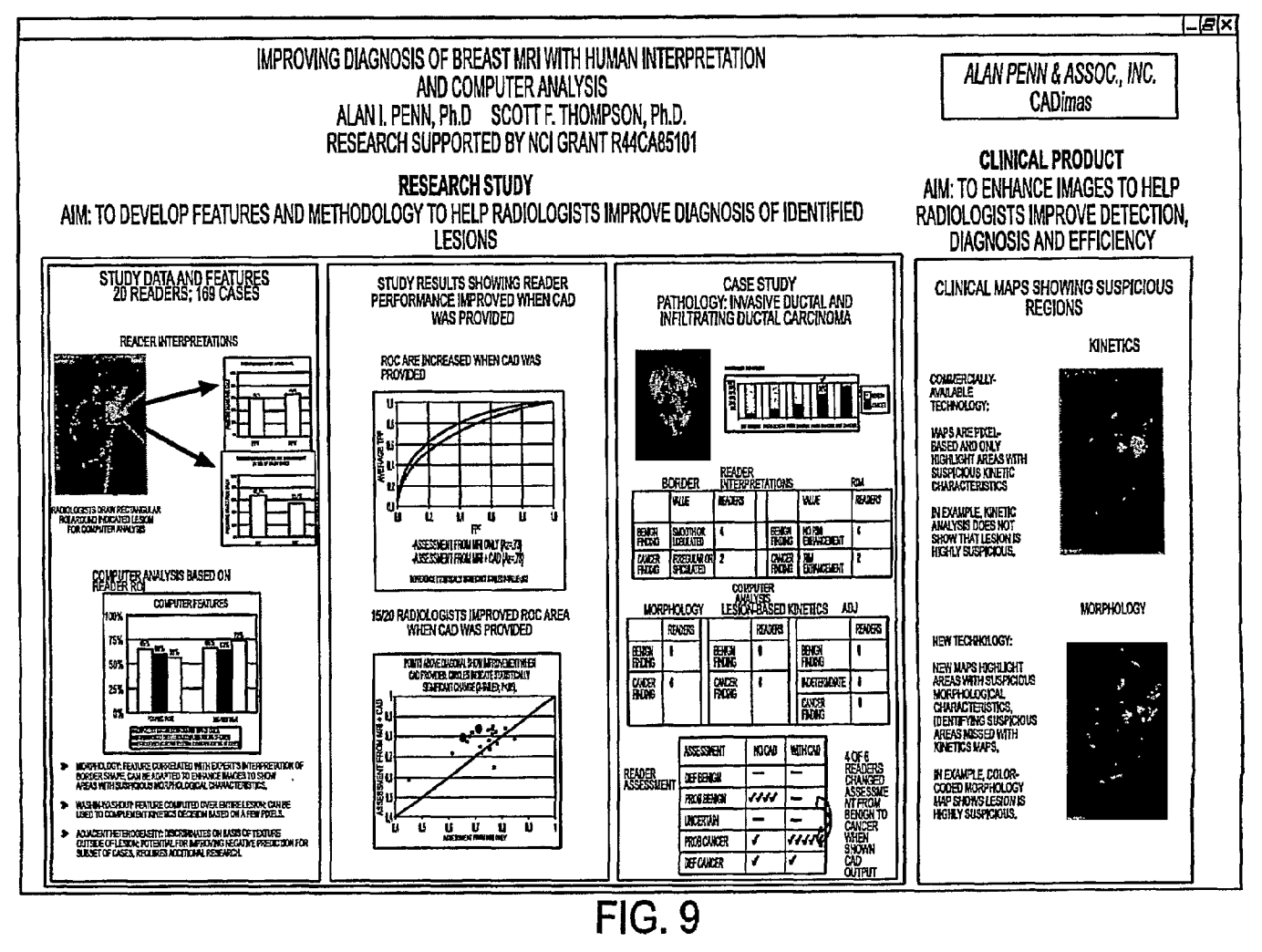

Each of FIGS. 10-13 is a reproduction of a respective one of the panels of FIG. 9.

Figure 14:
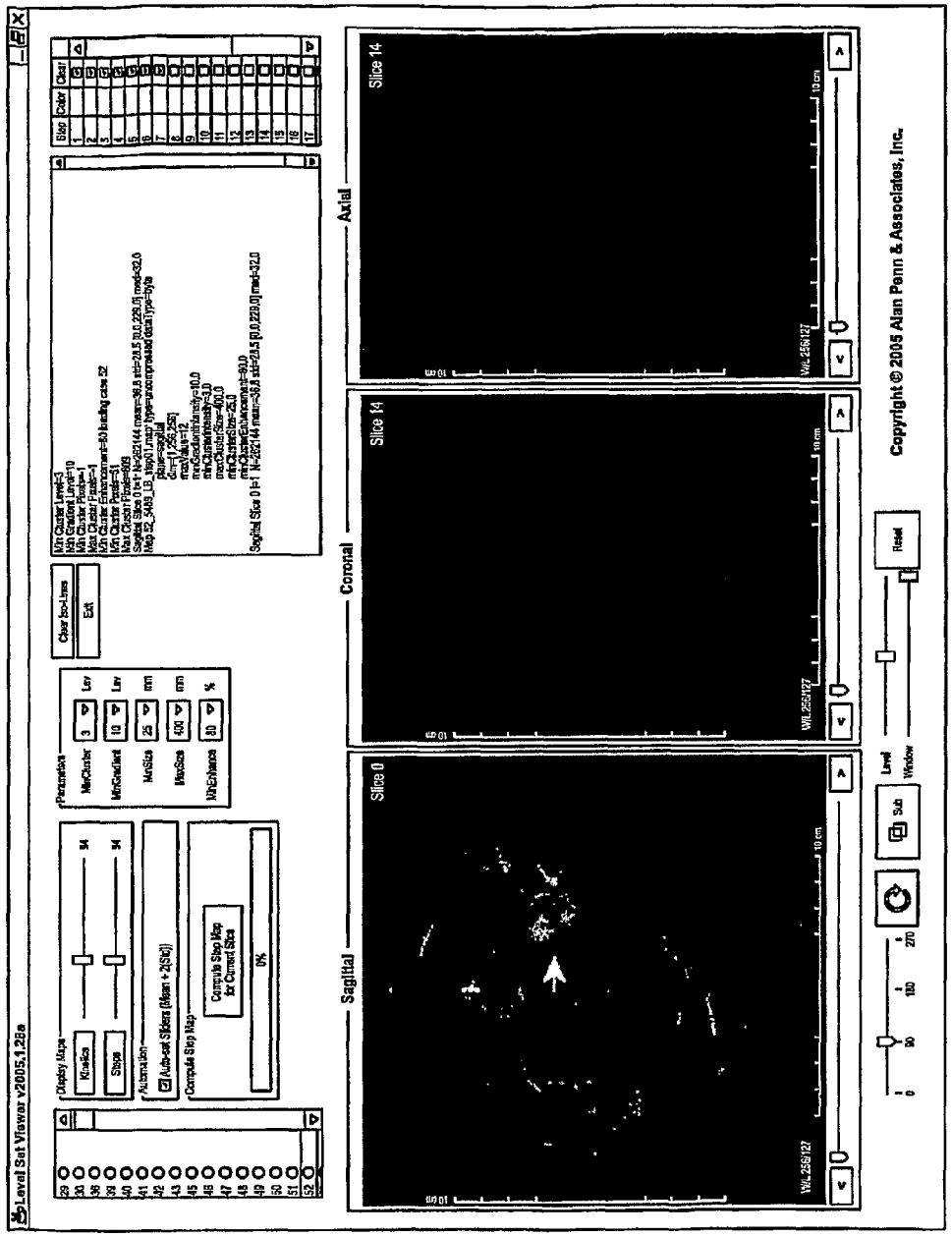

FIG. 14 is a screen capture illustrating a diagnostic display produced according to the invention.

DETAILED DESCRIPTION OF THE INVENTION

The current invention is a method, procedure, and set of computer codes for discriminating image representations of classes of objects, such as MRI signals of benign and malignant lesions, where the images have been transformed to meet constraints of the system, e.g., windowing/leveling, to display a lesion in the center of a range of displayed intensities. The methods, procedures, and computer codes of the invention discriminate classes of objects on the basis of intensity and spatial relationships of pixels, e.g., gradients and shapes, within or near the objects.

The invention will be described in terms of its application in medical-radiology for discriminating benign from malignant lesions on gadolinium-enhanced magnetic resonance images (MRI) on the basis of image intensity values where the image data being analyzed has 256 discrete intensity values and has been subjected to prior windowing and leveling operations according to known techniques. The invention is first described in terms of images corresponding to a 2 dimensional spatial slice. The extension of the invention to a set of 2-dimensional slices that comprise a 3-dimensional data set is described later. It is assumed that windowing and leveling is "reasonably consistent" between cases that are to be discriminated, conforming to standard medical practice, and for each case, a "landmark" showing the approximate location of the lesion, is known. It is understood that the invention may be applied to any imaging system in which the goal is to evaluate the image intensity and spatial relationships of the pixels in the image, within the skill of the ordinary artisan.

Using standard thresholding and clustering algorithms, a cluster is grown around the landmark for each possible intensity value, which according to one embodiment starts with the highest (e.g., 255) and ending with the lowest (0). The clusters around the landmark form a nested, monotonically increasing (but not necessarily strictly increasing) sequence. At each possible intensity level, a region-of-interest (ROI) is constructed around the cluster in a particular shape such that the ROI is the minimal shape containing the cluster. According to one embodiment, the ROI is a minimal rectangular box, or rectangular hull formed around the cluster. Other shapes may be used within the skill of the ordinary artisan. The ROIs also form a nested, monotonically increasing (but not necessarily strictly increasing) sequence. According to one embodiment of the present invention, where the ROI is a rectangular box, for each ROI in the sequence, we compute the area of the ROI by multiplying width by height. If the shape for the ROI is not a rectangular box, the area is computed using a different formula, depending on the ROI shape. If the characterization of the ROI being used is not the area, then a different formula may be used. As an example of a possible characterization other than area, in ultrasound, the ratio of width to height is important and this ratio can be used as the chosen characteristic. Further, if the ROI is depicted in 3-dimensions, instead of 2-dimensions, volume of the ROI may be used instead of area.

A plot of ROI area vs. intensity level is a step function—the plot of ROI area vs. intensity may remain constant for several intensity levels and then "step" up to a larger size. The number of steps has been found to be highly predictive of whether the lesion is benign or malignant using images from a variety of MRI imaging systems and protocols. Moreover, the number of steps has been found to show a high degree of independence from other discriminatory features and to be useful as a component of a computer-aided-diagnosis or computer-aided-detection system. In the specific example shown here, an image of a lesion is interpreted as being benign if the number of steps is less than or equal to 9 and is interpreted as being cancer if the number of steps is greater than 9. These thresholds may be adjusted as appropriate by an ordinarily skilled artisan. Additionally, other numbers related to the characterization of the ROI may be used.

While the number of distinct ROIs is a function of shape and gradient of a lesion, it is relatively insensitive to transformations of intensity values, such as windowing and leveling, provided that these transformations are not extreme (e.g., the leveling cannot have reduced the image to a few intensities).

One embodiment of the present invention can be alternatively described in a more general mathematical context as follows: A cluster is a set of connected pixels. A contour at level L is constructed by first generating a binary threshold image where a pixel in the threshold image has value 1 if the corresponding pixel in the grey-scale image has value$>=$L and has value 0 otherwise. A contour at level L is the set of pixels at the boundary of 0's and 1's on the binary image. The Outer Contour at level L is the contour at level L that encloses the landmark and is furthest from the landmark. The ROI at level L is a geometric object having a specified shape, such as a square or rectangular box, that is of minimal size around a cluster or contour.

1. Determine location of pixels in lesion. When we refer to "pixel" we mean the picture element at a specific location in the coordinate system of the image.

2. A landmark within the lesion is selected, either manually or automatically within the lesion. Clusters around the landmark are determined for each level L in a subset of possible intensity levels as determined by a predefined set of rules, and Outer Contours are determined for the cluster at each of the L's. For example, each intensity level within the image may be used, or some subset thereof, e.g., every other or every third intensity level may be sampled and used. In a more general context, other sets of closed paths around the landmark could be defined using other methods that are known, within the skill of the ordinary artisan.

3, Define a function, F, from the space of Outer Contours to the space of real numbers. In the specific method described above, for each L we determine the Outer Contour and define the function to be the area of the rectangle, $F(C)=Area (B)$, where B is the ROI defined to be the minimal rectangle around the Outer Contour. In a more general context, the ROI B could be another polygonal shape around the cluster that forms a nested sequence over the range of intensity levels, and F could be any function that discriminates distinct elements defining characteristics of the ROI in the nested sequence, within the skill of the ordinary artisan.

4. Define a function, G, on the range of F over the set of Outer Contours $\{C\}$. In the specific method described above, $G(\{RangeF_C\})=M$, where M is the number of distinct elements in the Range (i.e., the number of times F, the area, changes values). In a more general context, G could be another function used to characterize the function F of step 3, within the skill of the ordinary artisan. Further, it is possible to only consider steps in the Outer Contours in a portion of the range, to consider the density of steps, or other appropriate functions, as will be readily understood by those of ordinary skill in the art.

5. Define a feature, i.e., whether the lesion is more likely cancerous, benign, or uncertain, based on the function G. In the specific method described above a single threshold is set at 9 to discriminate benign from malignant lesions. In the more general context, a different threshold could be used or multiple thresholds or another distinguishing characteristic of G could be used to indicate different likelihoods of being benign or malignant, within the skill of the ordinary artisan.

Figure 1:
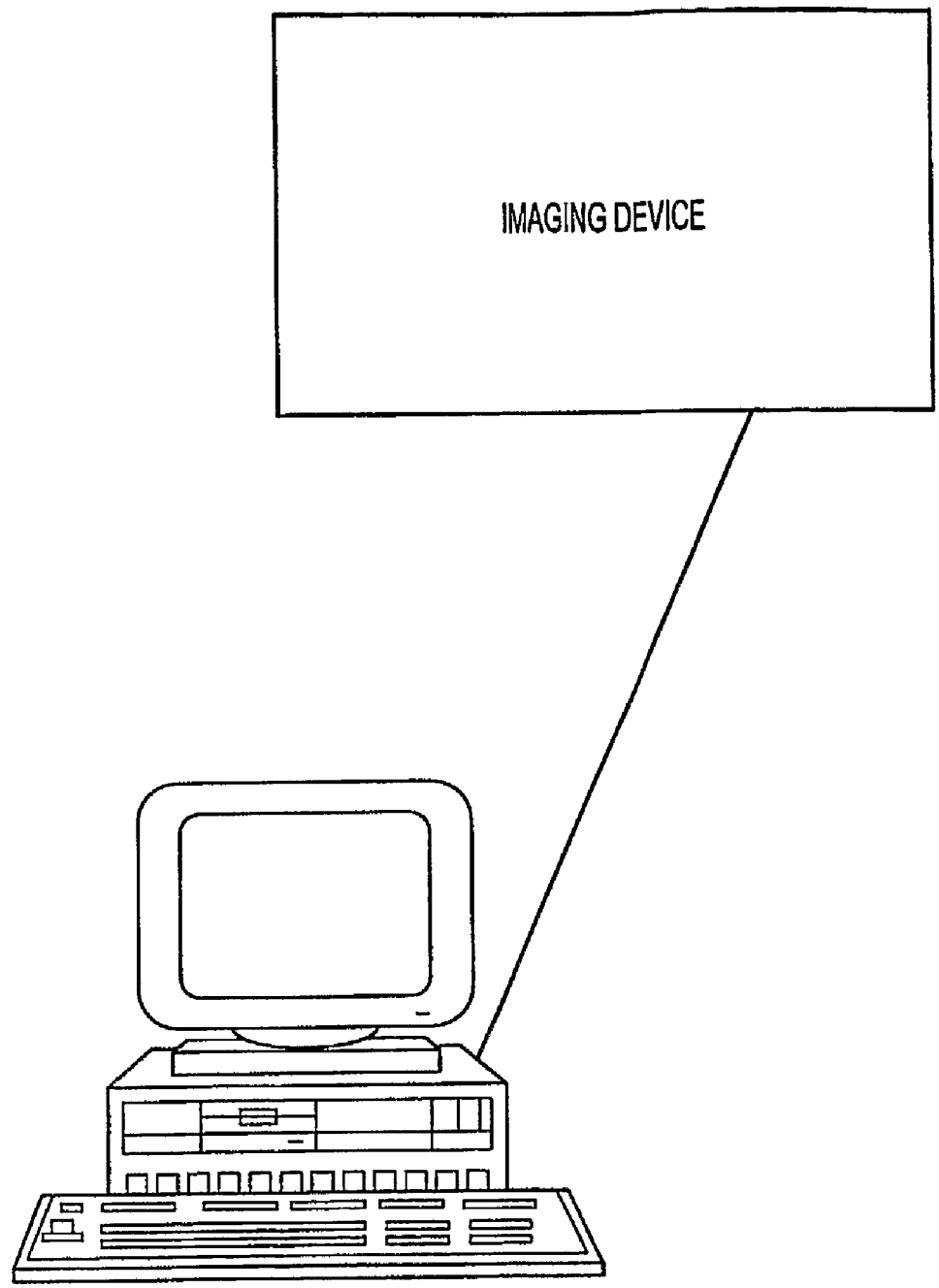
FIG. 1 is a diagram of the imaging device or picture archiving system and computer system according to one embodiment of the present invention.

According to one embodiment, the present invention is implemented on a computer connected to an imaging device or Picture Archiving system, such as a MRI device or other suitable imaging device or hospital PAC system (see FIG. 1). For purposes of this disclosure, we will refer interchangeably to a computer to mean a computer which is separate from the imaging device, or one which is integrated in the imaging device, wherein communication between the user and the computer (i.e., input device and display) is through the imaging device console, such as an MRI console. According to this embodiment, the computer has an input device (e.g., keyboard and mouse), a display device (e.g., monitor), and a processor. The processor can be a known system, including a storage device, a central processing unit (CPU), and other known components (not shown). The computer can be implemented separately, or as part of the imaging or archiving device. In the latter case, the display and input device of the imaging or archiving device could be used to interface with the computer, rather than separate components.

Figure 2:
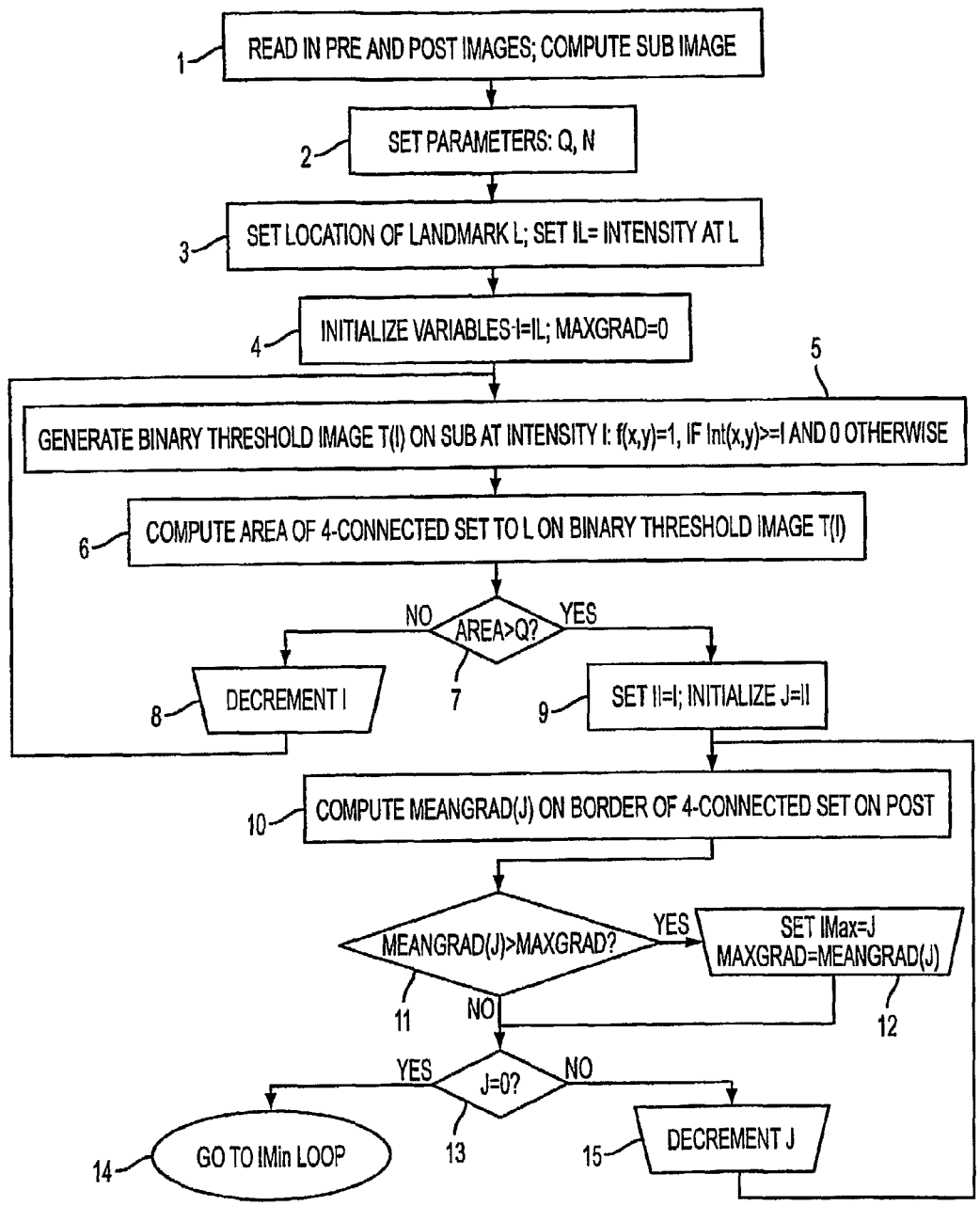
FIG. 2 is a flowchart of the method to initialize and compute $I_{Max}$ in accordance with one embodiment of the present invention.

Source data consists of pixel intensities of an image derived from the MRI signal captured after use of contrast agent (POST) and pixel intensities of an image derived from the MRI signal captured before use of contrast agent (PRE). Pixel intensities of a subtraction (SUB) image are obtained by subtracting the pixel intensities of PRE from pixel intensities of the POST (FIG. 2, step 1). If there are multiple post contrast images, the post contrast image that corresponds to peak enhancement is used. We indicate below whether SUB or POST is used for each step in the current implementation.

According to one embodiment of the present invention, parameters are set to: Q=25 mm$^2$, N=4, (FIG. 2, step 2), where Q is a lower bound on the area of the lesion, and N is determined heuristically to approximate the point at which the cluster effectively grows into background noise. The meaning of the number N is explained as follows: A minimum size of the lesion, E, is obtained by first constructing the Outer Contours at each intensity level, L, starting with the intensity level of the landmark and decrementing, until a level is reached for which the area within the Outer Contour first exceeds Q, the lower bound set by parameter. As intensity level L is further decremented, the area within the Outer Contour increases, ultimately encompassing the entire image, including background tissue outside of the lesion. For each of these Outer Contours, the mean gradient along the corresponding path on the Post image is computed. The level IMax, which corresponds to the maximum mean gradient, is selected and the area within Outer Contour of level IMax is the minimum area of the lesion. As the index L is decremented beyond IMax, the area within the Outer Contours increases. When the area first exceeds N times the minimum area of the lesion, the Outer Contour is assumed to have extended beyond the lesion and grown into the background tissue.

The "step feature" is a measurement of a grouping of enhancing pixels on the SUB image, as determined by a landmark, L, defined to be a single pixel in an enhancing group. (FIG. 2, step 3). In general, different landmarks within the same enhancing group will produce different step feature values. The landmark that is used can either be determined by an expert using image and contextual information or determined automatically from image processing and/or histogram analysis. In the implementation according to one embodiment, histogram analysis is used to identify pixels intensities that are likely to be part of a lesion, and cluster analysis is used to identify collections of enhancing pixels that are likely to comprise the lesion. The centroid or other identified region of the cluster of enhancing pixels can be used to identify the landmark. In the implementation according to another embodiment, a radiologist draws a rectangular, or other shaped, ROI around the lesion and the landmark is the center point of the ROI. This ROI is input to the processor by the input device.

We now describe the step feature algorithmically, and assume for this discussion that there are 256 possible pixel intensity levels on the images, ranging from 255 (highest) to 0 (lowest). Let I(L) denote the pixel intensity at the landmark, each pixel having a particular intensity I in the range of $0 \leq I < 255$. According to another embodiment of the invention, each pixel may have a particular intensity I in the range of $0 \leq I < 2^N$, where N is an integer>1, which would include image displays with 128, 512 or 1024 intensity levels. Starting with level I=I(L) and decrementing I at each step, we construct the cluster of pixels that are 4-connected to L and have intensity level>=I. A cluster is 4-connected if there is a 4-neighbor path from every pixel in the cluster to every other pixel in the cluster where pixels are 4-neighbor if they are side-by-side or one directly above the other. Other forms of connectivity, including, but not limited to, 8-neighbor in 2-dim and 6-neighbor, 18-neighbor or 26-neighbor in 3-dim can also be used. (See *Digital Image Processing*, Gonzalez and Waitz, 2$^{nd}$ Edition, Adison & Wesley, 1987.) These clusters form a monotonically increasing set $\{C_N, C_{N-1}, \ldots\}$, with Function $(C_N)$<=Function $(C_{N-1})$<= . . . as the index is decremented. When in 2-dimensions, the Function is the Area of the cluster. When in 3-dimensions, the Function may be the Volume of the cluster. Other alternatives also can be used, within the skill of the ordinary artisan. This process is continued until intensity level equals II, where Function $(C_{II})$>=Q, where the Function is Area when in 2-dim, and Volume when in 3-dim. II is the first level at which the Function of the Outer Contour exceeds the lower bound of the lesion as set by the parameter. (FIG. 2, steps 4-9). Step 5 computes the binary threshold image used to derive the Outer Contour and Step 6 computes the Function (such as area or volume) within the Outer Contour.

Figure 8:
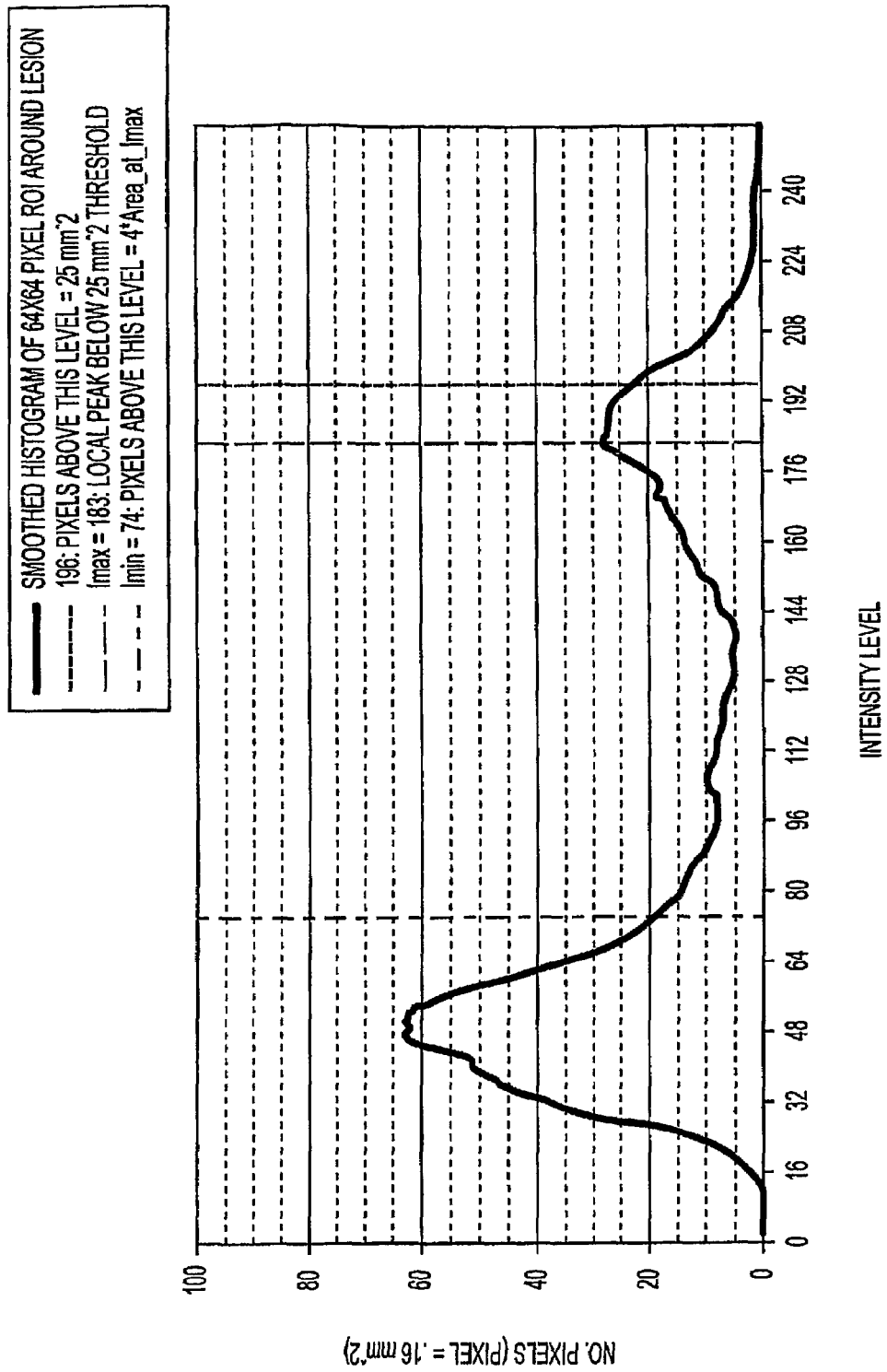
FIG. 8 illustrates one example of a method of using histogram analysis to determine Imax and Imin.
Figure 10:
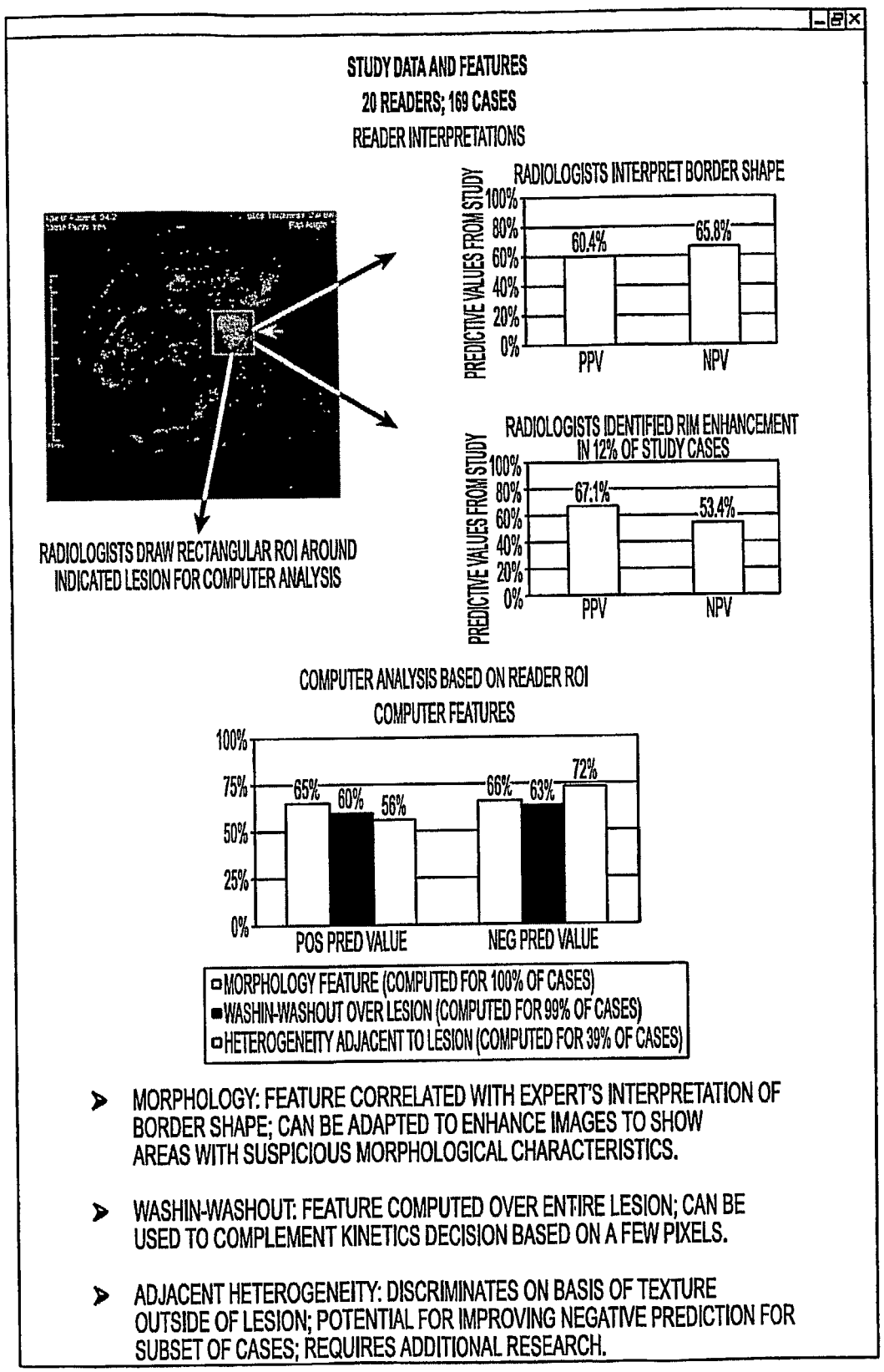
Figure 11:
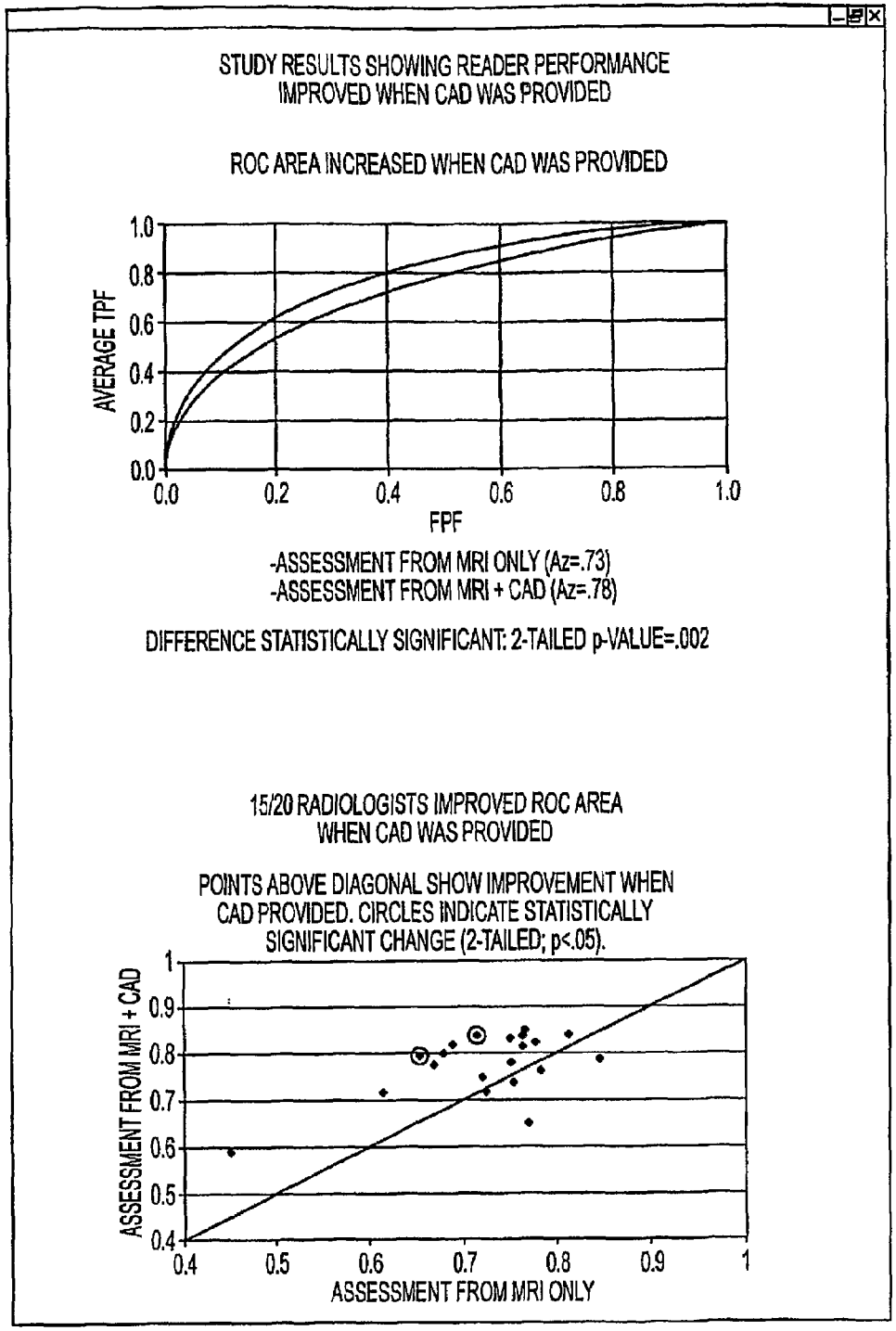
Figure 12:
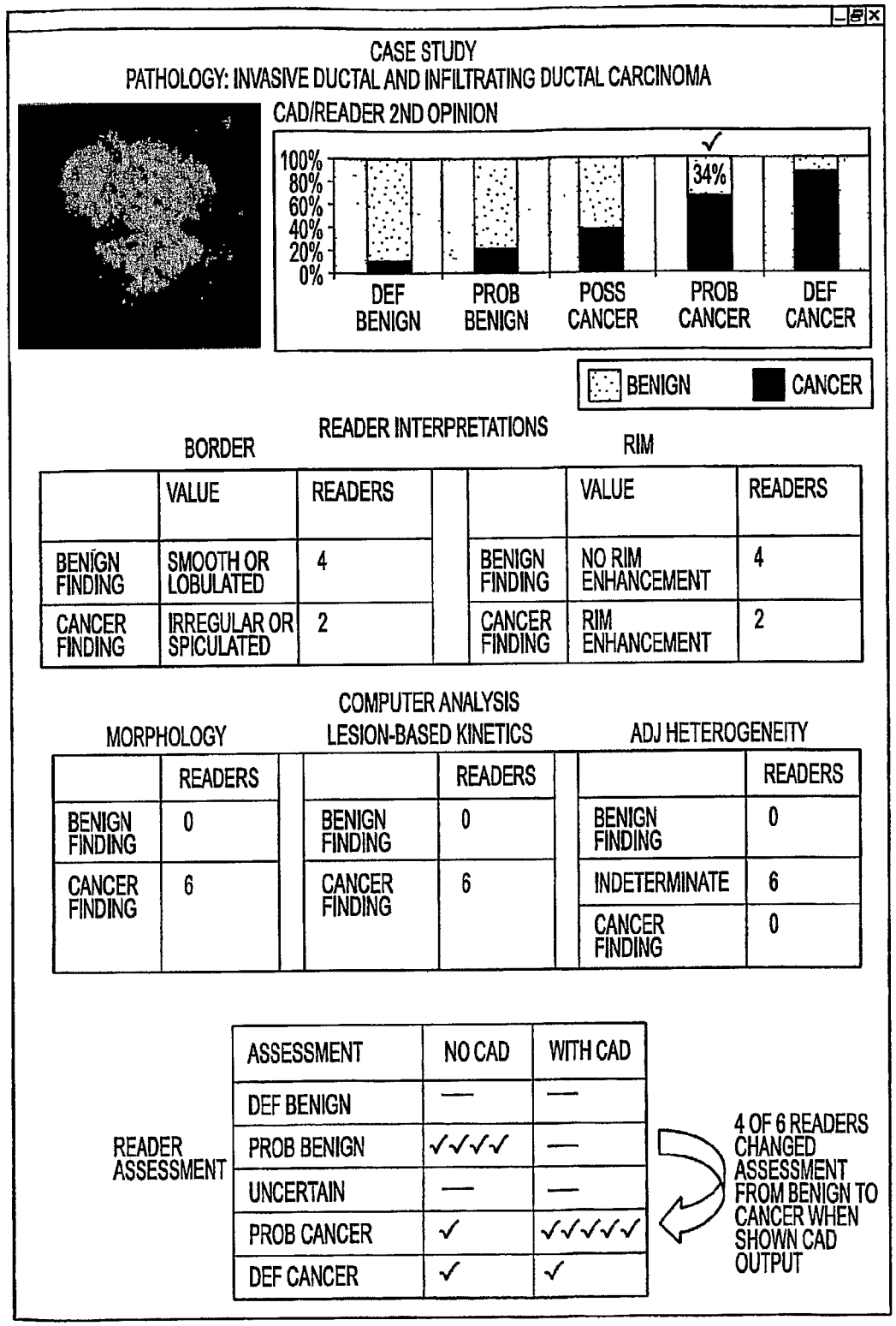
Figure 13:
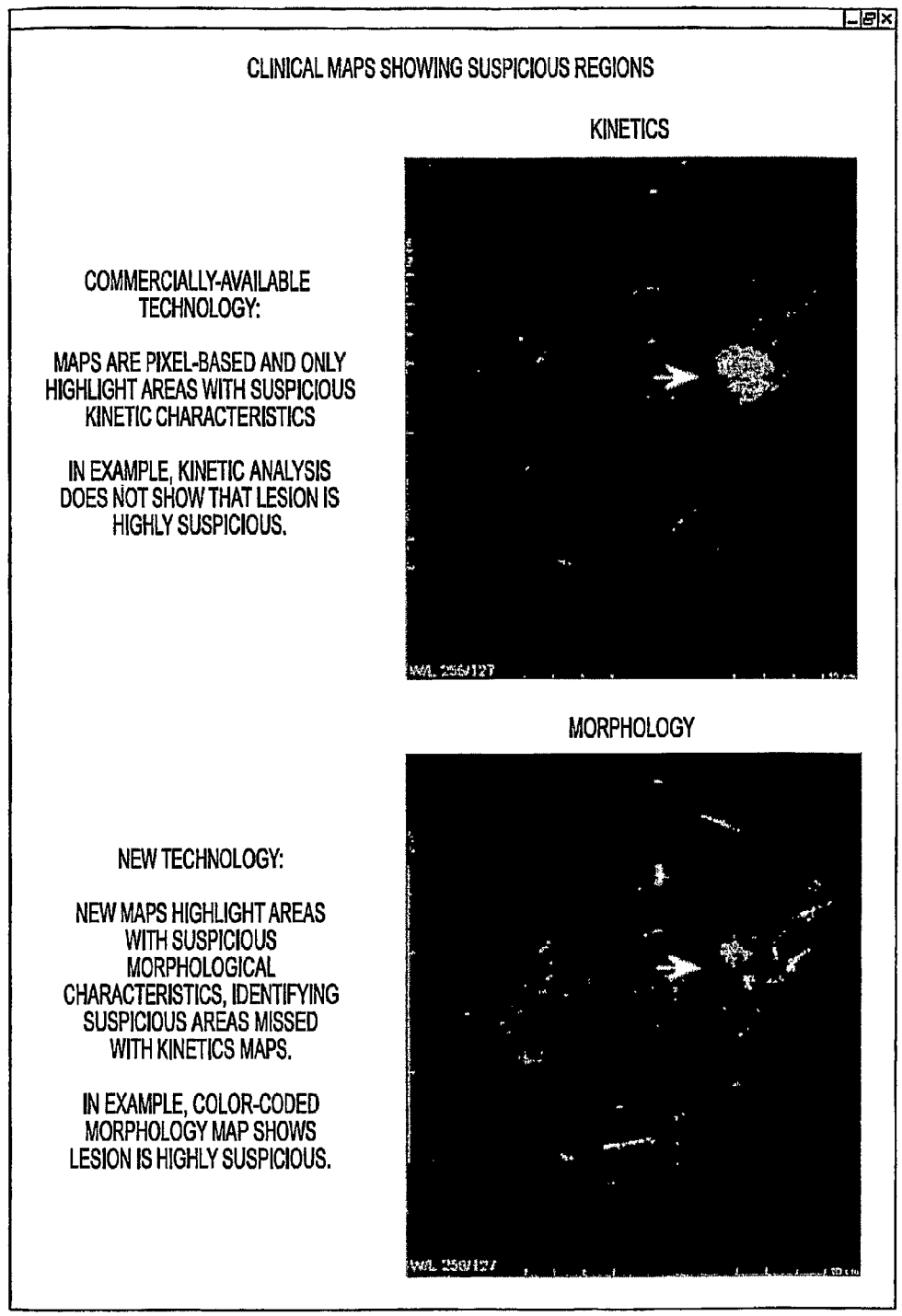

An $I_{max}$ and an $I_{min}$ value can be determined using a histogram analysis. Alternatively, according to one embodiment, starting with intensity level J=II and decrementing by J at each step, the mean gradient on the border of the 4-connected set $C_J$ (MeanGrad(J)) is computed using data from POST. (FIG. 2, step 10). The intensity level at which MeanGrad is maximum defines level $I_{max}$ (FIG. 2, steps 11-14). For each pixel on the Outer Contour, the gradient of the corresponding pixel in the Post image is computed using standard image processing techniques. The MeanGrad is defined as the mean of this set of computed gradient values. One example of a method of using histogram analysis to determine Imax and Imin is illustrated in FIG. 8. A 64×64 pixel subimage containing a lesion was cropped from a breast MRI post-contrast image. The graph in FIG. 8 shows the histogram of pixel intensities within the cropped subimage, after smoothing. Each pixel in the MRI image covers an area approximately equal to 0.4×0.4=0.16 mm$^2$. For each intensity level, the approximate area of pixels having that intensity level is computed by multiplying the number of pixels having that intensity level by 0.16 mm$^2$. For each intensity level, the approximate area of pixels having that intensity level or greater is computed by summing the areas for all intensity levels greater than or equal to the given intensity level. Intensity level 196, shown by the vertical bar furthest to the right, is the first intensity level such that the area of pixels greater than or equal to that level exceeds an area of 25 mm$^2$, corresponding to the parameter Q in the embodiment given above. Intensity level 183, which is used as Imax, shown by the middle vertical bar, is the intensity level at which the histogram reaches its maximum in the right peak of the histogram. The area of pixels having values greater than or equal to Imax is computed as described above. Intensity level 74, which is used as Imin, shown by the left vertical bar, is the highest intensity level such that the area of pixels greater than or equal to that level exceeds the area computed from Imax by a factor of 4, corresponding to the parameter N in the embodiment given above.

Figure 3:
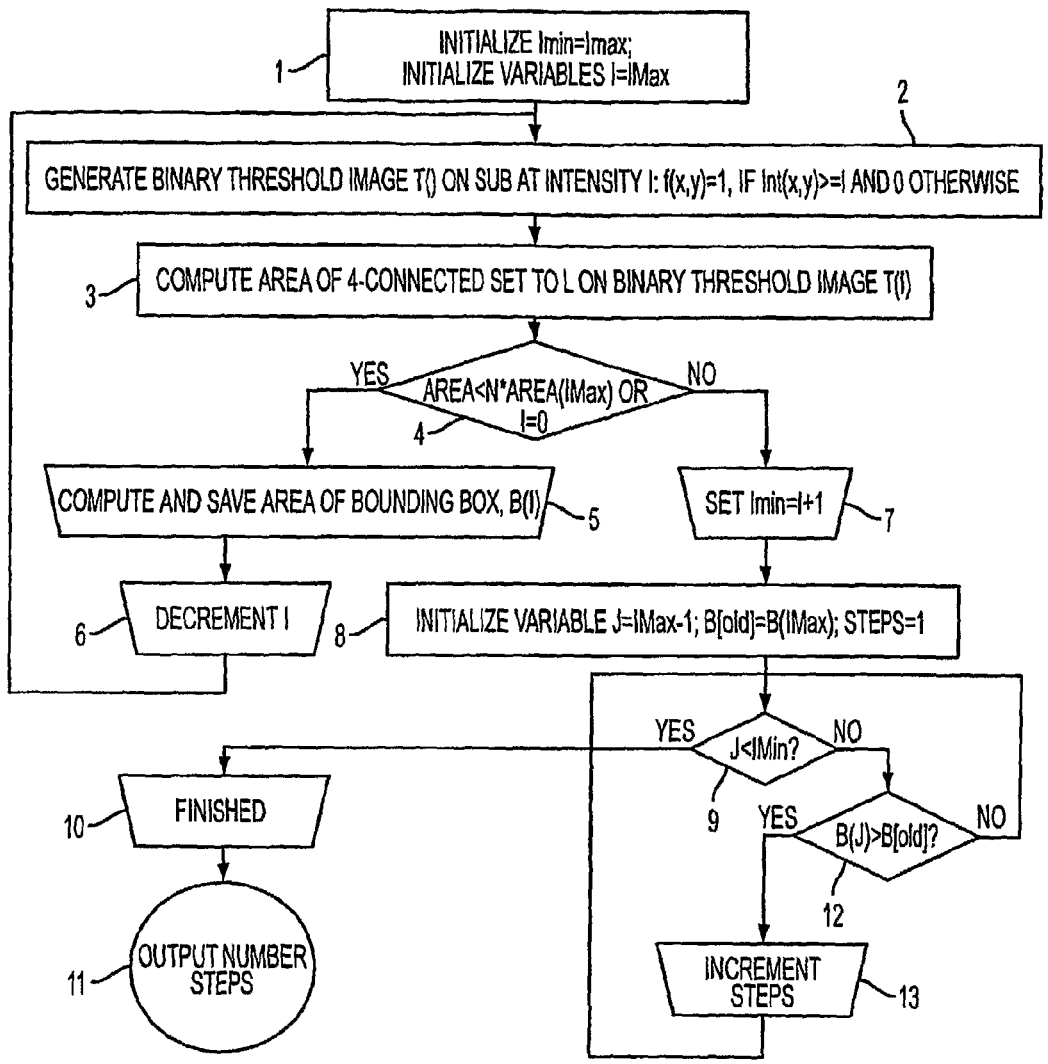
FIG. 3 is a flowchart of the method to compute $I_{Min}$ and number steps, in accordance with one embodiment of the present invention.

$I_{min}$ is set as the lowest intensity level for which the Function of $C_{Imin}$ exceeds the Function of $C_{Imax}$ by some predetermined multiple, i.e., Function $(C_{Imin})$>N*Function $(C_{Imax})$. (FIG. 3, Steps 1-7.) Alternative criteria for establishing $I_{min}$ can be determined from context, cluster size, cluster numbers, or histogram analysis, within the skill of the ordinary artisan.

Starting with level $I=I_{max}$ and decrementing through $I=I_{min}$, the minimum bounding ROI $B_I$ around $C_I$ is constructed and the Functions representing the characteristics ROIs are computed: $B_{Imax} \subset B_{Imax-1} \subset \ldots$, with Function $(B_{Imax}) \leq$ Function $(B_{Imax-1}) \leq \ldots$. Depending upon the changes in Outer Contours from one intensity level to the next lower intensity level, the minimum bounding ROIs may increase or remain constant. Each time that a decrement in intensity level induces a change in the Function of the minimum bounding ROI, a step counter is incremented. The "step feature" is the final value of the step counter which is output as the total number of steps when B(J)>B (old) where B (old) is the previous minimum bounding ROI. A determination is then made as to whether the lesion is more likely to be benign, cancerous or of an uncertain nature, based on the total number of steps. (FIG. 3, steps 8-12.) It is also contemplated that another number related to the changes in the characteristics of ROI can be used instead of the total number of steps.

Figure 4:
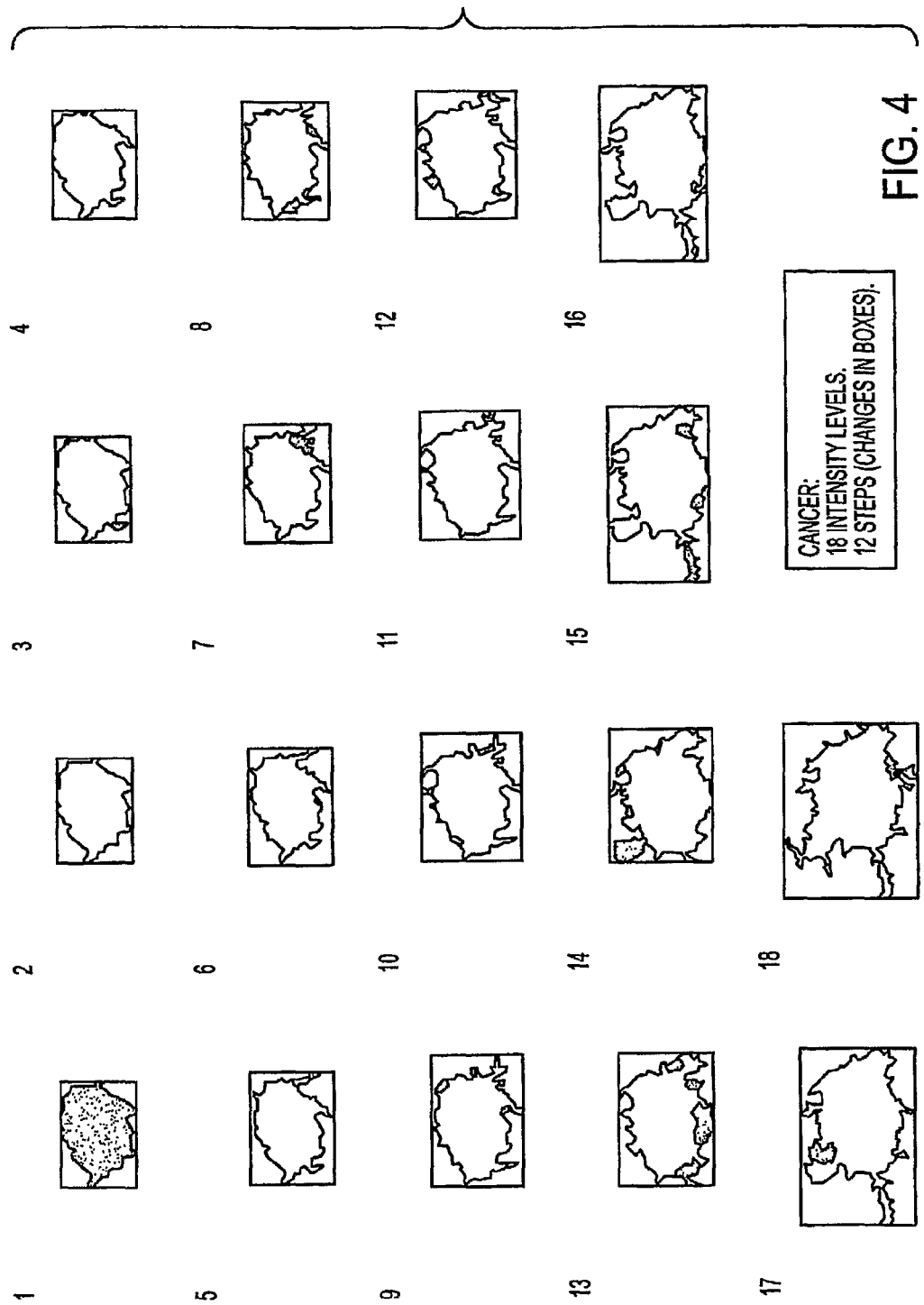
FIG. 4 illustrates the clusters and bounding boxes for a malignant lesion in accordance with one embodiment of the present invention.
Figure 5:
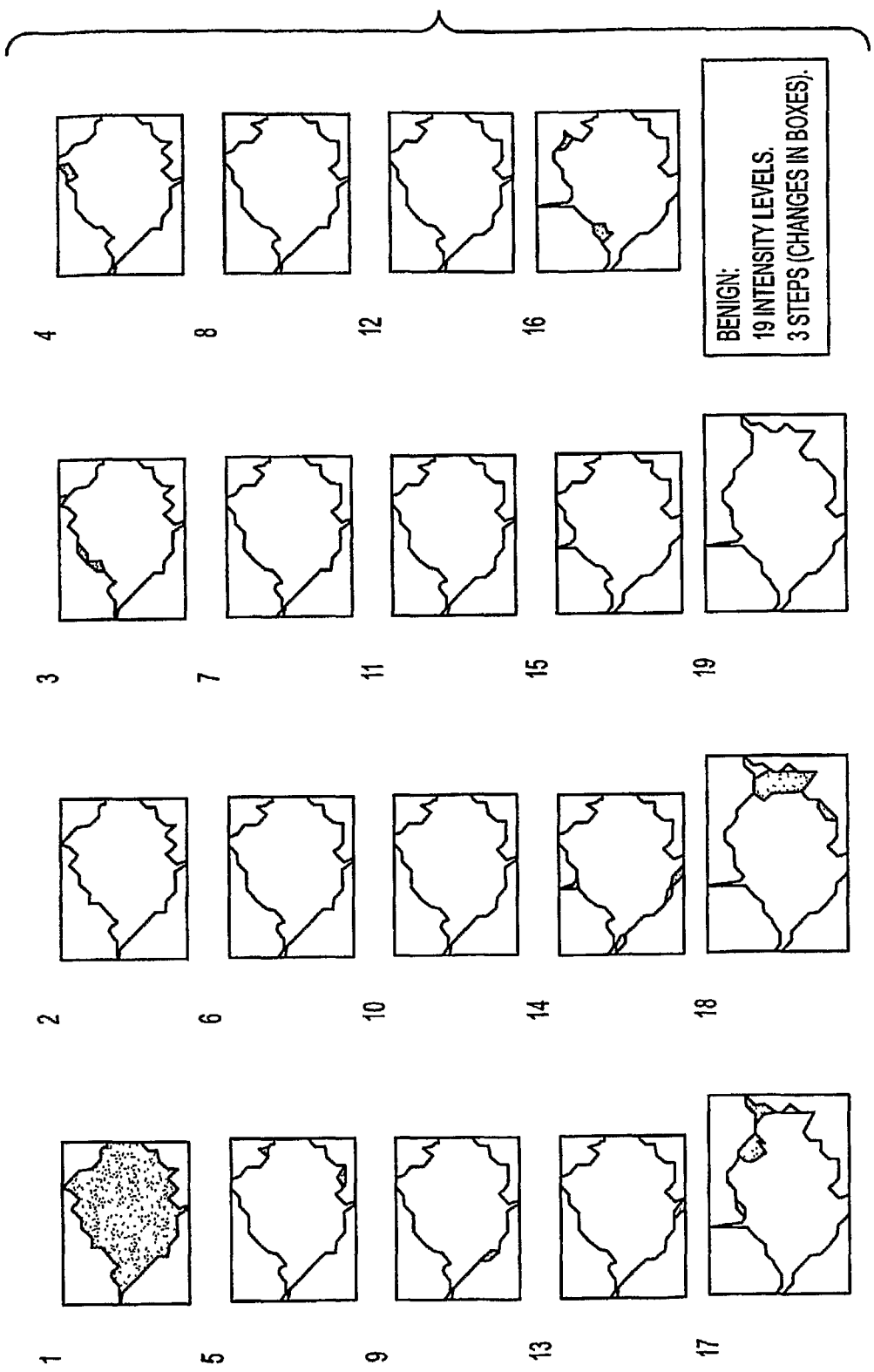
FIG. 5 illustrates the clusters and bounding boxes for a benign lesion in accordance with one embodiment of the present invention.

FIGS. 4 and 5 show the contours and bounding ROIs, in this case, rectangles for a malignant and benign lesion, respectively. Box 1 shows the cluster at intensity level $I_{max}$. Growth of the cluster (pixels that have been added from the previous intensity level) is shown in black. Bounding boxes that have increased from the previous level are shown with a solid border; bounding boxes that have not increased are shown with a dotted border.

The two lesions have comparable sizes, shapes, and intensity ranges on the MRI images. However, the malignant lesion shows twelve steps (different boxes); the benign lesion shows three such steps.

Note that growth of the cluster occurs at many intensity levels—even for the benign case. In noisy images, growth of the cluster will occur at virtually every intensity level, regardless of the characteristics of the underlying physiological object being studied. The step feature effectively filters out many of the small incidental changes in cluster growth and is relatively insensitive to the placement of the landmark.

Validation of Invention for Discriminating Benign from Malignant Breast Lesions

Data were obtained from a study conducted under grant R44CA85101 issued by the National Cancer Institute (NCI) to develop and evaluate a computer-aided-diagnosis (CAD) system for breast MRI.

Breast MRI images for 169 cases were collected from 5 institutions using 6 different imaging systems/protocols. 35 radiologists participated in the study, each interpreting 60 cases. Approximately ½ of the cases read by each radiologist were cancers and approximately ½ of the cases were benign. All cases were biopsy proven. Each case was interpreted by a minimum of 6 and a maximum of 19 radiologists. The multiple readers resulted in a sample of landmarks, and consequently a sample of step function values, for each case.

Figure 6:
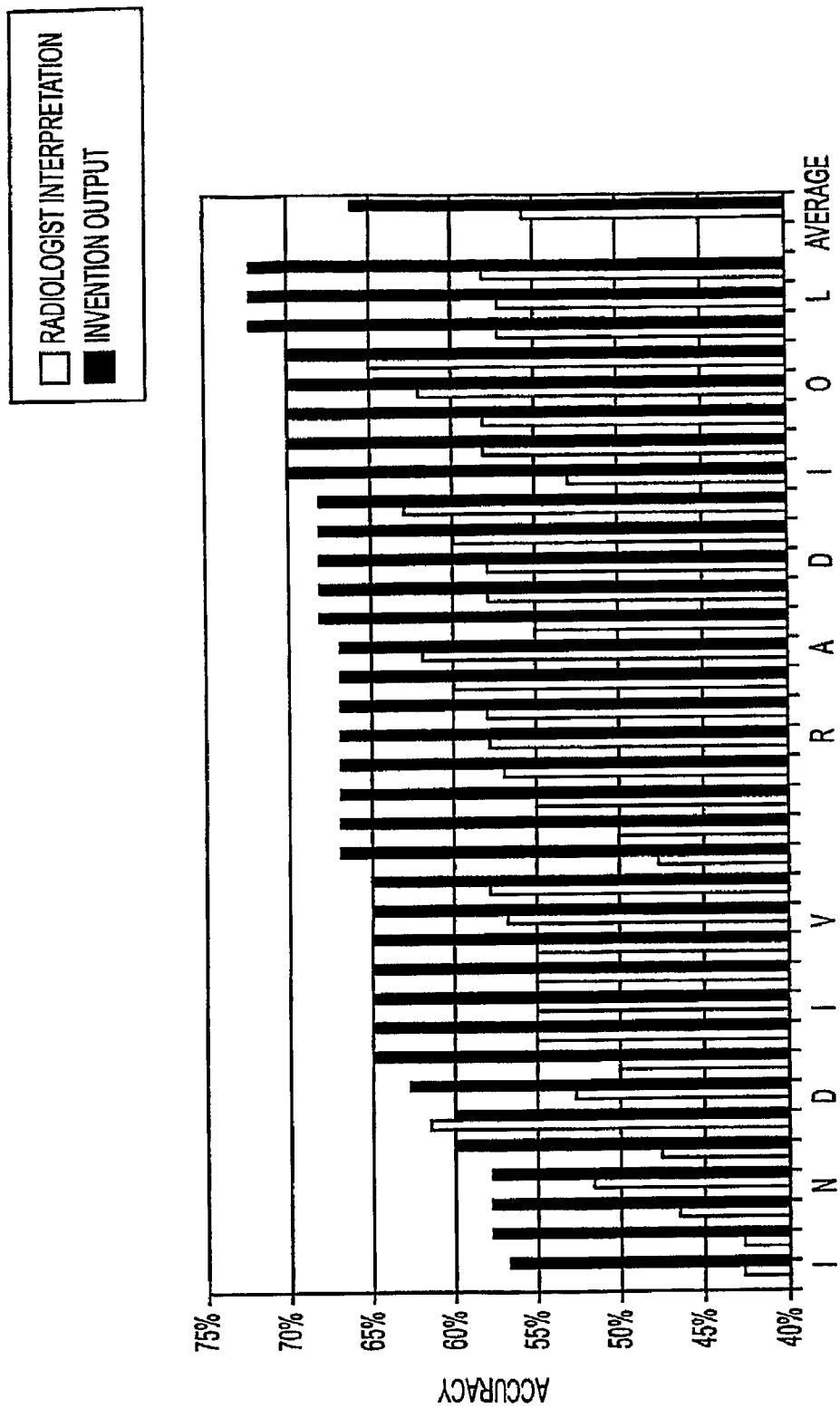
FIG. 6 is a graph showing that the invention was better at discriminating benign from malignant breast lesions on MRI on the basis of image intensity than 34 of 35 radiologists tested in a multi-center reader study.

The CAD system calculated the step function and converted values into a binary Intensity feature, using a threshold of 9 steps: steps≦9 resulted in Intensity=0; steps>9 resulted in Intensity=1. Performances for both radiologists' interpretations of intensity and the step function were evaluated using accuracy of predicted pathology when compared to the true pathology. The step function produced from the invention was more accurate than the radiologists in 34 of the 35 tests. The average accuracy of the step function was 66%. The average accuracy of the radiologists' interpretations of intensity was 56%. The accuracies are shown in Table 1 below and are also graphically illustrated in FIG. 6.

TABLE 1

| | Radiologist Interpretation | Invention Output |
|---|---|---|
| I | 0.43 | 0.57 |
| | 0.43 | 0.58 |
| | 0.47 | 0.58 |
| N | 0.52 | 0.58 |
| | 0.48 | 0.6 |
| | 0.62 | 0.6 |
| D | 0.53 | 0.63 |
| | 0.5 | 0.65 |
| | 0.55 | 0.65 |
| I | 0.55 | 0.65 |
| | 0.55 | 0.65 |
| | 0.55 | 0.65 |
| V | 0.57 | 0.65 |
| | 0.58 | 0.65 |
| | 0.48 | 0.67 |
| | 0.5 | 0.67 |
| | 0.55 | 0.67 |
| | 0.57 | 0.67 |
| R | 0.58 | 0.67 |
| | 0.58 | 0.67 |
| | 0.6 | 0.67 |
| A | 0.62 | 0.67 |
| | 0.55 | 0.68 |
| | 0.58 | 0.68 |
| D | 0.58 | 0.68 |
| | 0.6 | 0.68 |
| | 0.63 | 0.68 |
| I | 0.53 | 0.7 |
| | 0.58 | 0.7 |
| | 0.58 | 0.7 |
| O | 0.62 | 0.7 |
| | 0.65 | 0.7 |
| | 0.57 | 0.72 |
| L | 0.57 | 0.72 |
| | 0.58 | 0.72 |
| Average | 56% | 66% |

The goal of the NCI-supported study was to have an unbiased set of test images. In spite of this goal, the cancer lesions in the test set were larger than benign lesions in the test set by a statistically significant amount. An analysis was conducted to determine if the apparent discrimination derived from the number of steps was a direct consequence of lesion size bias in the test set.

The lesion size as interpreted by the radiologist was estimated to be (Area=width×height) of a rectangular region-of-interest (ROI) drawn by the radiologist around the lesion. To reduce the effect of very large and very small lesions and force consensus among readers on the number of steps for each case, analysis was restricted to evaluations that met the following criteria:

ROI_Area>=300 pixels;
ROI_Area<=1800 pixels; and
Number of steps=consensus (mode) number of steps for readers who interpreted that case.

138 cases (69 benign; 69 cancers) had ROIs that met the criteria and non-ambiguous modes for number of steps among readers.

For each of case, the mean ROI_area was computed for radiologists that met the evaluation criteria. Mean ROI_areas for cancers and benigns were as follows:

Cancers: 987 pixels; and
Benigns: 877 pixels.

While there remained a difference in size, this difference was not statistically significant using 2-tailed t-test with p=0.05.

Using the consensus (mode) steps for each of the 138 cases, the mean number of steps for cancers and benigns were as follows:

Cancers: 10.9; and
Benign: 7.3.

This difference was statistically significant with p-value<0.0001.

It is not fully understood why the step feature is so effective at discriminating benign from malignant breast lesions on MRI while being relatively independent of other known discriminatory features. We conjecture that the step feature combines aspects of gradient, shape, intensity and size that are each discriminatory and that the following factors come into play in the step features.

Benign lesions are believed, in many cases, to have sharper edges (steeper gradients) than malignant lesions. This is likely due to angiogenesis of malignant lesions that cause their boundaries to appear fuzzy on MRI. On the other hand, the sharp delineations between benign lesions and surrounding tissue result in a steep gradient. The sharper edges of benign lesions cause them to have larger, but fewer, steps before reaching maximum intensity.

Malignant lesions are believed, in many cases, to have stronger source signals than benign lesions. The strong source signal may give rise to more opportunity for steps.

When source signals are transformed to image intensities on the display, the benign lesions may be "stretched out" (windowed) to fill a portion of the displayable intensity range that is comparable to that of a malignant lesion. If a malignant lesion has a strong source signal, it does not have to be stretched out as much as a low-intensity benign lesion for display purposes. Stretching out a low-intensity signal has the effect of adding low order bits to the output signal—if an image spans 64 intensity levels it can be represented by 6 bits; if a stretched image spans 256 levels, it requires 8 bits of data. The inclusion of the two low order bits may introduce noise that results in the addition of more steps, effectively masking out some of the discriminatory effectiveness of the measured gradient. Evaluating changes in the rectangular ROI derived from the contour instead of changes in the cluster mitigates some of the effect of the noise induced by the stretching operation. In particular, noise on pixels that lie on or adjacent to the boundary of the cluster, but lie properly within the rectangular ROI will frequently affect the cluster shape, but not the ROI shape.

Malignant lesions tend to have more spiculations and irregularities than benign lesions. Growth on these spiculations may induce a larger number of changes in the rectangular hull than the growth in the benign lesions.

As noted above, imaged malignant lesions may be, in general, larger than imaged benign lesions. This may be due to a variety of reasons, including the sharper gradients of benign lesions that may make them visible at a smaller size and the more rapid growth of malignant lesions between patient visits. The larger malignant lesions have more opportunity for steps. The analysis presented above indicates that this is not the only discriminatory factor, but it still may be a contributing factor to the effectiveness of this feature.

Figure 7:
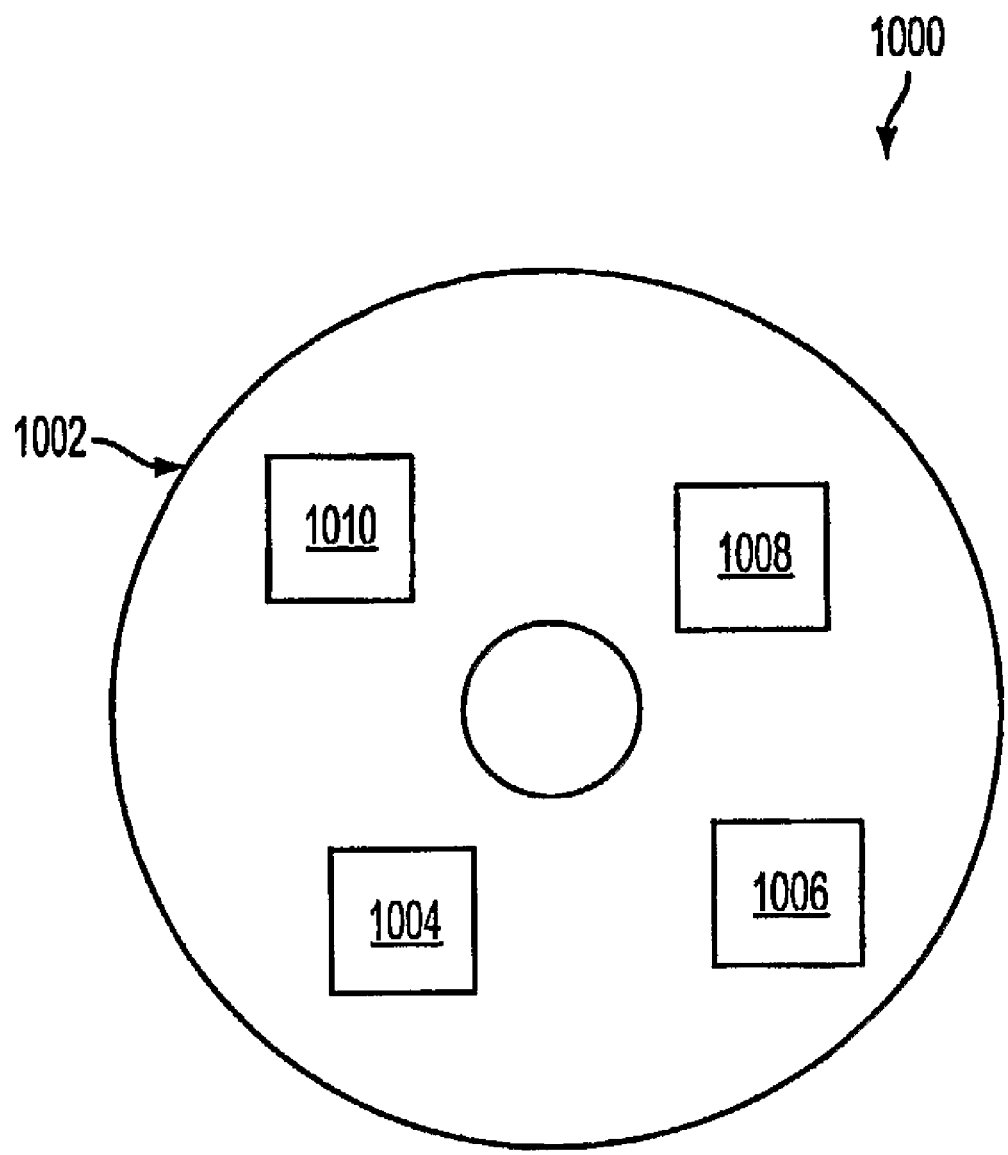
FIG. 7 is a block diagram illustrating a computer program product in accordance with one embodiment of the present invention.

Referring now to FIG. 7, an article of manufacture or a computer program product 1000 of one embodiment of the invention is illustrated. The computer program product 1000 includes a recording medium 1002, such as, a floppy disk, a high capacity read only memory in the form of an optically read compact disk or CD-ROM, a tape, a transmission type media such as a digital or analog communications link, or a similar computer program product. Recording medium 1002 stores program means 1004, 1006, 1008, and 1010 on the medium 1002 for carrying out the methods for implementing the image evaluation method according to the embodiments of the invention.

A sequence of program instructions or a logical assembly of one or more interrelated modules defined by the recorded program means 1004, 1006, 1008, 1010, direct the image evaluation system 100 for implementing the image evaluation of the embodiments of the invention.

According to another embodiment of the invention, diagnostic information can be produced for a large area of the breast, and even the entire breast, based on the acquired source data. This embodiment will be described below with respect to two-dimensional source data obtained from a cross-sectional "slice" through a breast, i.e. a thin region bounded by two parallel planes. This data is constituted by a matrix, or grid array, of pixels measuring perhaps 256×256 pixels. Each pixel has a value representative of image intensity at a corresponding point within the matrix.

According to the embodiment here under consideration, the procedure described earlier herein can be performed using each pixel in the matrix as a starting point, or landmark. As a result, for each pixel, p, there is produced a numerical value, or step value, equal to the number of steps (number of changes in the bounding box size) that occur when the procedure is carried out over the intensity level range $I_{max}(P)$ to $I_{min}(P)$ The result is a set of data containing a step value for each pixel in the original matrix.

Then, adjacent pixel locations having the same step value are grouped into clusters, the step values are divided into ranges, e.g. >9 and ≦9, and a map of the "slice" is produced in which each cluster having step values>9 is displayed in a first color, e.g. red, and each cluster having step value≦9 is displayed in a second color, e.g. white. Or alternatively, each cluster having step value c 9 could be set transparent, revealing the pixel intensity shown on the original image.

Of course, it may prove desirable to divide the step values into a larger number of ranges each associated with a distinct color. Each color would represent a different likelihood that the area in question is malignant, where the greater the number of step values, the greater the chances of malignancy.

According to an alternative of this embodiment, needed computing power and processing time can be reduced by not determining a step value for each pixel. Instead, a representative step value is computed for a cluster of pixels and that representative step value is assigned to each pixel in the cluster.

More specifically, at the beginning of the procedure, 4-connected clusters of pixels having the highest intensity value are constructed using data from the SUB image. Each such cluster is evaluated to determine if it satisfies minimum criteria according to user-defined parameters. Specifically, a cluster must satisfy the following minimum criteria: (1) when the number of pixels in the cluster is multiplied by a factor that relates pixel size to physical size in the subject that has been imaged (for example, each pixel may correspond to a physical area of 0.8 mm$^2$ on the subject), the product must equal or exceed a minimum value, set by a parameter (for example, 25 mm$^2$); and (2) for each pixel in the cluster, the percentage enhancement of the POST over the PRE is determined by first subtracting the pixel value of the PRE from the pixel value of the POST and then dividing the difference by the value of the PRE, and the average percentage enhancement is computed for all pixels within the cluster, and this average must equal or exceed a minimum value, set by a parameter (for example 80%). If no cluster satisfies the minimum criteria, then clusters of the next lower intensity value are tested; this process is continued until an intensity level is found for which a cluster satisfies the minimum criteria. If no cluster satisfies the minimum criteria for any intensity level, then all pixels in the image are assigned a step value of 0.

If multiple clusters satisfy the minimum criteria at some intensity level in this iterative process, then the cluster of largest size is used as the starting cluster in the procedure and the intensity level at which this cluster was computed is the "starting intensity level." Once the starting cluster has been determined, the cluster is filled-in to include all pixels that lie within the boundary of the cluster. The average gradient around the perimeter of the cluster is then computed using data from the POST image. The cluster is then grown by adding to it all pixels having intensity values at the next lower intensity level ("starting intensity level"−1) that are adjacent to the starting cluster. The average gradient of the grown cluster is then computed and compared to the average gradient of the starting cluster. If the average gradient of the grown cluster is less than the average gradient of the starting cluster, then $I_{max}$ is set equal to "starting intensity level." If the average gradient of the grown cluster is more than the average gradient of the starting cluster, then the grown cluster is used as a new starting cluster and the next lower intensity level is used a new starting intensity level, and the procedure is continued at this decremented intensity level.

Once $I_{max}$ is set, the procedure continues as described in the original patent application by determining $I_{min}$ and computing the step value as the number of changes in bounding boxes between $I_{max}$ and $I_{min}$. All pixels within the filled-in cluster at $I_{max}$ are assigned a step value equal to the step value computed in this way. Based on present studies, it is believed that $I_{max}$ should correspond to a ROI corresponding to a physical area of not greater than 400 mm$^2$ on the subject.

The process is then repeated using the same procedure, but may or may not exclude from consideration all pixels that have been assigned a step value. By way of example, the given area of the filled-in cluster at $I_{max}$ may measure 100 mm$^2$ or more on the source data image. The resulting data is then processed as described above to produce the desired map and the corresponding color coded display.

The above description defines the discriminating feature in terms of a function of clusters on the 2-dimensional slice. The invention can be extended to a set of 2-dimensional slices by defining one or more statistics on the set of functions on the individual slices. For example, one statistic may be the maximum function value over the set of 2-dimensional slices. This statistic may be used to identify the enhancement in the breast that has the most cancer-like characteristics and may be useful for assessing the likelihood that a breast, rather than a specific lesion, contains cancer. A second statistic may a measure of the spatial distribution of clusters that have function values exceeding some threshold. Such a measure may be, for example, the standard deviation of the vertical location of the center of enhancements exceeding a step count of 9 located within the 3-dimensional breast. This statistic may be useful for identifying breasts that do not contain cancer but show patterns that appear to be suspicious that are spread throughout the breast.

The procedures according to the invention can be adapted to produce three-dimensional step value maps and resulting displays using techniques known in the art, such as those employed in the CGI field.

It has been found that a significant advantage of the invention is that it provides information at least comparable to that produced by methods that are used to reveal "blooming effects". This is a kinetic method described in the paper "Is the 'blooming sign' a promising additional tool to determine malignancy in MR mammography", by Fischer et al, Eur. Radiol (2004) 14:394-401, published online on 27 Sep. 2003, Springer-Verlag. This method is based on data from several images obtained over a period of time, for example at one minute intervals over a period of eight minutes. For this, the patient is required to remain still for the entire period and any movement will reduce the reliability of the information obtained. In contrast, the present invention requires, at most, only two sets of source data, one before and one after injection of an enhancement agent. Indeed, the invention could be carried out on the basis of image data acquired in only one time frame after injection.

In connection with determination of measurement landmarks, it would be advantageous to eliminate, or filter out, data relating to areas that are not of interest. For example, when the area of study is the breast, the outer surface of the breast can produce image data that would be interpreted as points of enhancement. This data can be filtered out. Similarly, data relating to the region within the chest wall can be filtered out.

During the procedure for determining the value to be used for $I_{max}$, which is based on local gradients, a first maximum gradient value may be identified, and then a second maximum gradient value may be encountered in a region of much lower pixel intensities. If this should occur, the $I_{max}$ value will be determined on the basis of the first maximum gradient encountered. On the other hand, if a second maximum gradient value is encountered in a region of pixel intensities only slightly less than those associated with the first maximum gradient value, then $I_{max}$ may be determined on the basis of the second maximum gradient encountered.

FIG. 9 is a chart illustrating various features and advantages of the invention and FIGS. 10-13 are reproductions of individual panels of FIG. 9. FIG. 14 is a screen capture of a display of diagnostic results produced according to the invention.

It is to be understood by one of ordinary skill in the art that the methods set forth herein for evaluating images can be combined with other methods of evaluation to provide even better accuracy of results.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

Thus the expressions "means to . . . " and "means for . . . ", or any method step language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same functions can be used; and it is intended that such expressions be given their broadest interpretation.

What is claimed is:

1. A method of evaluating images obtained from an imaging device of a body region, wherein at least one of the images shows an abnormality indicative of a possible lesion, comprising the steps of:

determining locations of pixels in each image that show such abnormality;

for each of a set of intensity levels, I, determining a contour around the cluster containing the pixels at the locations determined in the step of determining;

defining a function, F, that discriminates a distinct characteristic of each contour in a nested sequence;

defining a function, G, used to characterize the changes in the value of the function F over the range of contours at each intensity level; and identifying a lesion as being more likely to be benign or more likely to be cancerous based on at least one threshold value for the function G or based on threshold values and locations of pixels depicting a plurality of lesions within the body region.

2. The method according to claim 1, wherein the step of determining a contour comprises the step of defining the cluster using intensity threshold levels around a landmark.

3. The method according to claim 1, wherein the step of defining a function F comprises the step of defining a function F(C)=Area (B), where B is a geometric contour formed around the cluster.

4. The method according to claim 3, wherein the geometric contour is a rectangular box in 2 or 3 dimensions.

5. The method according to claim 1, wherein the at least one threshold is set at 9 to discriminate benign from malignant lesions.

6. The method according to claim 1, wherein the function, G, reflects the number of changes in the value of the function F over the range of contours at each intensity level.

7. The method of claim 1, wherein images containing one or more lesions in a portion of a patient's body are evaluated, and wherein an image consists of a matrix of pixels, each pixel having an intensity indicative of the presence or absence of a lesion, said method further comprising the steps of:

identifying a plurality of regions of interest in the image; and for each region of interest, performing said method.

8. A method of evaluating whether a lesion in an image obtained from an imaging device is cancerous, benign or uncertain, the image comprising a plurality of pixels, each pixel having a particular intensity I in the range of $0 \leq I < 2^N$, where N is an integer>1, comprising the steps of:

defining a landmark pixel within the lesion in the image;

growing a cluster around the landmark pixel which contains the lesion for each intensity value in a set of possible intensity values in the range 0 to $2^N-1$, at each intensity levels in the set, constructing a region of interest such that the region of interest is a minimal polygon containing the cluster at that intensity level;

computing a value of a characteristic of the minimal polygon at each of the intensity levels in the set;

determining a number relating to changes in the characteristic values over the range of intensity levels; and determining whether the lesion is more likely to be cancerous, benign or uncertain in response to the number related to changes in the characteristic values over the range of intensity levels, or based on threshold values and locations of pixels depicting a plurality of lesions within the body region.

9. The method according to claim 8, further comprising the step of outputting the changes in the characteristic values, the threshold values and locations of pixels depicting a plurality of lesions within the body region determined in the step of determining, the number of intensity levels within the lesion and an indication of the determination of whether the lesion is more likely to be cancerous, benign or uncertain.

10. The method of claim 9, wherein whether a plurality of lesions in an image are cancerous, benign or uncertain, is evaluated, the image comprising a plurality of pixels, each pixel having a particular intensity I in the range of $0 \leq I < 2^N$, where N is an integer>1, said method further comprising the steps of:

Identifying a plurality of regions of interest in the image; and for each region of interest, performing said method.

11. The method according to claim 8, wherein the minimal polygon is in 2-dimensions, and the characteristic computed in the step of computing is the area of the minimal polygon.

12. The method according to claim 11, wherein the minimal polygon is a rectangle.

13. The method according to claim 8, wherein the minimal polygon is in 3-dimensions, and the characteristic computed in the step of computing is the volume of the minimal polygon.

14. The method according to claim 13, wherein the minimal polygon is a rectangular box.

15. The method according to claim 8, wherein $2^N=256$.

16. A method of evaluating images obtained from an imaging device, wherein at least one of the images contains, a lesion, over time comprising the steps of:

gathering pixel intensities of post-images in one time frame derived from the signal captured after use of a contrast agent and pixel intensities of a pre-image derived from the signal captured before use of the contrast agent;

subtracting the pixel intensities of the pre-image from the pixel intensities of the post-image to obtain pixel intensities of a subtraction image;

selecting a region of interest that surrounds the lesion;

setting a landmark within the region of interest, where the landmark may consist of one or more pixels;

starting with level I=I(L) and decrementing I at each step, constructing the cluster of pixels that are M-connected to L, where M is an integer multiple of 2, depending on the number of dimensions reflected in the image, and have intensity level>=I, where I(L) denotes the pixel intensity at the landmark such that the clusters form a monotonically increasing set $\{C_N, C_{N-1}, \ldots\}$, with Function($C_N$)<=Function($C_{N-1}$)<= ..., where Function depends in part on the number of dimensions reflected in the image, and continuing this process until intensity level equals II, where Function($C_{II}$)>=$Q_9$ where Q is a predetermined value;

determining $I_{min}$ and $I_{max}$;

starting with level I=$I_{max}$ and decrementing through I=$I_{min}$, constructing a minimum bounding box $B_I$ around $C_I$ and computing the Functions of the boxes, $B_{Imax} \subset B_{Imax-1} \subset \ldots$, with Function($B_{Imax}$)$\leq$Function($B_{Imax-1}$)$\leq \ldots$;

incrementing a step counter each time that a decrement in intensity level induces a change in the Function characteristic of the minimum bounding box;

outputting a total number of steps when B(J)>B(previous bounding box); and determining whether the lesion is more likely to be benign, cancerous or uncertain based on the total number of steps, or based on threshold values and locations of pixels depicting a plurality of lesions within the body region.

17. The method according to claim 16, wherein the post-images in one time frame are selected from a plurality of post-images such that the post-images in one time frame correspond to peak enhancement.

18. The method according to claim 16, further comprising setting parameters Q and N such that Q=25 mm² and N=4.

19. The method according to claim 16, wherein the step of selecting a region of interest comprises inputting a region of interest set by a user through an input device.

20. The method according to claim 16, wherein the step of selecting a region of interest comprises determining the region of interest automatically from an image processing and/or histogram analysis.

21. The method according to claim 16, wherein when 2 dimensions are reflected in the image, M is selected from the group consisting of 4 and 8, and the Function is Area.

22. The method according to claim 16, wherein when 3 dimensions are reflected in the image, M is selected from the group consisting of 6, 18, and 26, and the Function is Volume.

23. The method according to claim 16, wherein $I_{min}$ and $I_{max}$ are determined as follows:
starting with level J=II and decrementing by J at each step, computing a mean gradient on the border of $C_J$ (Mean-Grad(J)) using data from post-images in one time frame where the intensity level at which MeanGrad is maximum defines level $I_{max}$; and
setting $I_{min}$ as a highest intensity level for which the area of $C_{Imin}$ exceeds the area of $C_{Imax}$ multiplied by some predetermined value, Function($C_{Imin}$)>N*Function($C_{Imax}$).

24. The method according to claim 16, wherein $I_{min}$ and $I_{max}$ are determined using a histogram analysis.

25. A non-transitory computer program product for performing a method of evaluating images, wherein at least one of the images contains a lesion, the computer program product embodied on a computer readable memory and comprising a series of instructions for:
determining locations of pixels in the lesion;
for each of a set of intensity levels, I, determining a contour around the cluster containing the pixels identified in the step of determining;
defining a function, F, that discriminates a distinct characteristic of each contour in a nested sequence;
defining a function, G, used to characterize the changes in the value of the function F over the range of contours at each intensity level; and
identifying a feature responsive to the function G, as being more likely to be benign or more likely to be cancerous based on at least one threshold value for the function G, or based on threshold values and locations of pixels depicting a plurality of lesions within the body region.

26. The non-transitory computer program product according to claim 25, wherein the instructions for determining a contour comprises instructions for defining the cluster using intensity threshold levels around a landmark.

27. The non-transitory computer program product according to claim 25, wherein the instructions for defining a function F comprises instructions for defining a function F(C)= Area (B), where B is a geometric contour formed around the cluster.

28. The non-transitory computer program product according to claim 25, wherein the geometric contour is a rectangular box in 2 or 3 dimensions.

29. The non-transitory computer program product according to claim 25, wherein the at least one threshold is set at 9 to discriminate benign from malignant lesions.

30. The non-transitory computer program product according to claim 25, wherein the function, G, reflects the number of changes in the value of the function F over the range of contours at each intensity level.

31. A non-transitory computer program product for performing a method of evaluating whether a lesion in an image is cancerous, benign or uncertain, the image comprising a plurality of pixels, each pixel having a particular intensity I in the range of $0 \leq I < 2^N$, where N is an integer>1, the computer program product embodied on a computer readable memory and comprising a series of instructions for:
defining a landmark pixel within the lesion in the image;
growing a cluster around the landmark pixel which contains the lesion for each intensity value in a set of possible intensity values in the range 0 to $2^N-1$,
at each intensity level in the set, constructing a region of interest such that the region of interest is a minimal polygon containing the cluster at that intensity level;
computing a value of a characteristic of the minimal polygon at each of the intensity levels in the set;
determining a number related to changes in the characteristic values over the range of intensity levels; and
determining whether the lesion is more likely to be cancerous, benign or uncertain in response to the number related to changes in the characteristic values over the range of intensity levels, or based on threshold values and locations of pixels depicting a plurality of lesions within the body region.

32. The non-transitory computer program product according to claim 31, further comprising instructions for outputting the function based on changes in the value of the area of the regions of interest determined by the instructions for determining, the number of intensity levels within the lesion and an indication of the determination of whether the lesion is more likely to be cancerous, benign or uncertain.

33. The non-transitory computer program product according to claim 31, wherein the minimal polygon is in 2-dimensions, and the characteristic computed in the step of computing is the area of the minimal polygon.

34. The non-transitory computer program product according to claim 33, wherein the minimal polygon is a rectangle.

35. The non-transitory computer program product according to claim 31, wherein the minimal polygon is in 3-dimensions, and the characteristic computed in the step of computing is the volume of the minimal polygon.

36. The non-transitory computer program product according to claim 35, wherein the minimal polygon is a rectangular box.

37. The non-transitory computer program product according to claim 31, wherein $2^N=256$.

38. A non-transitory computer program product for performing a method of evaluating images, wherein at least one of the images contains a lesion, over time, the computer program product embodied on a computer readable memory and comprising a series of instructions for:
gathering pixel intensities of post-images in one time frame derived from the signal captured after use of a contrast agent and pixel intensities of a pre-image derived from the signal captured before use of the contrast agent;
subtracting the pixel intensities of the pre-image from the pixel intensities of the post-images in one time frame to obtain pixel intensities of a subtraction image;
selecting a region of interest that surrounds the lesion;

setting a landmark within the region of interest;
starting with level I=I(L) and decrementing I at each step, constructing the cluster of pixels that are M-connected to L, where M is an integer multiple of 2, depending on the number of dimensions reflected in the image, and have intensity level>=I, where I(L) denotes the pixel intensity at the landmark such that the clusters form a monotonically increasing set $\{C_N, C_{N-1}, \ldots\}$, with Function($C_N$)<=Function($C_{N-1}$)<= ..., where the Function depends at least in part on the number of dimensions reflected in the image, and continuing this process until intensity level equals II, where Function($C_{II}$)>=Q, where Q is predetermined value;
determining $I_{max}$;
determining $I_{min}$;
starting with level I=$I_{max}$ and decrementing through I=$I_{min}$, constructing a minimum bounding box $B_I$ around $C_I$ and computing the Functions of the boxes, $B_{Imax} \subseteq B_{Imax-1} \subseteq \ldots$, with Function($B_{Imax}$)≦Function($B_{Imax-1}$)≦...;
incrementing a step counter each time that a decrement in intensity level induces a change in the Function characteristic of the minimum bounding box;
outputting a total number of steps when B(J)>B(previous bounding box); and
determining whether the lesion is more likely to be benign, cancerous or uncertain based on the total number of steps, or based on threshold values and locations of pixels depicting a plurality of lesions within the body region.

39. The non-transitory computer program product according to claim 38, wherein the post-images in one time frame are selected from a plurality of post-images such that the post-images in one time frame correspond to peak enhancement.

40. The non-transitory computer program product according to claim 38, further comprising instructions for setting parameters Q and N such that Q=25 mm$^2$ and N=4.

41. The non-transitory computer program product according to claim 38, wherein the instructions for selecting a region of interest comprise instructions for inputting a region of interest set by a user through an input device.

42. The non-transitory computer program product according to claim 38, wherein the instructions for selecting a region of interest comprise instructions for determining the region of interest automatically from an image processing and/or histogram analysis.

43. The non-transitory computer program product according to claim 38, wherein when 2 dimensions are reflected in the image, M is selected from the group consisting of 4 and 8, and the Function is Area.

44. The non-transitory computer program product according to claim 38, wherein when 3 dimensions are reflected in the image, M is selected from the group consisting of 6, 18, and 26, and the Function is Volume.

45. The non-transitory computer program product according to claim 38, wherein the steps of determining $I_{max}$ and $I_{min}$ comprise:
starting with level J=II and decrementing by J at each step, computing a mean gradient on the border of $C_J$ (MeanGrad(J)) using data from the post-images in one time frame where the intensity level at which MeanGrad is maximum defines level $I_{max}$; and
setting $I_{min}$ as a highest intensity level for which the area of $C_{Imin}$ exceeds the area of $C_{Imax}$ multiplied by some predetermined value, Function($C_{Imin}$)>N*Function($C_{Imax}$).

46. The non-transitory computer program product according to claim 38, wherein the steps of determining $I_{max}$ and $I_{min}$ use a histogram analysis.

47. A method of evaluating images obtained from an imaging device, wherein at least one of the images contains a lesion, over time comprising the steps of:
gathering pixel intensities of post-images in one time frame derived from the signal captured after use of a contrast agent and pixel intensities of a pre-image derived from the signal captured before use of the contrast agent;
subtracting the pixel intensities of the pre-image from the pixel intensities of the post-images in one time frame to obtain pixel intensities of a subtraction image;
selecting a region of interest that surrounds the lesion;
setting a landmark within the region of interest;
starting with level I=I(L) and decrementing I at each step, constructing the cluster of pixels that are M-connected to L, where M is an integer multiple of 2, depending on the number of dimensions reflected in the image, and have intensity level>=I, where I(L) denotes the pixel intensity at the landmark such that the clusters form a monotonically increasing set $\{C_N, C_{N-1}, \ldots\}$, with Function($C_N$)<=Function($C_{N-1}$)<= ..., where Function depends in part on the number of dimensions reflected in the image, and continuing this process until intensity level equals II, where Function($C_{II}$)>=Q, where Q is a predetermined value;
starting with level J=II and decrementing by J at each step, computing a mean gradient on the border of $C_J$ (MeanGrad(J)) using data from the post-images in one time frame where the intensity level at which MeanGrad is maximum defines level $I_{max}$;
setting $I_{min}$ as a highest intensity level for which the area of $C_{Imin}$ exceeds the area of $C_{Imax}$ multiplied by some predetermined value, Function($C_{Imin}$)>N*Function($C_{Imax}$);
starting with level I=$I_{max}$ and decrementing through I=$I_{min}$, constructing a minimum bounding box $B_I$ around $C_I$ and computing the Functions of the boxes, $B_{Imax} \subseteq B_{Imax-1} \subseteq \ldots$, with Function($B_{Imax}$)≦Function($B_{Imax-1}$)≦...;
incrementing a step counter each time that a decrement in intensity level induces a change in the Function characteristic of the minimum bounding box;
outputting a total number of steps when B(J)>B(previous bounding box); and
determining whether the lesion is more likely to be benign, cancerous or uncertain based on the total number of steps, or based on threshold values and locations of pixels depicting a plurality of lesions within the body region.

48. A non-transitory computer program product for performing a method of evaluating images, wherein at least one of the images contains a lesion, over time, the computer program product embodied on a computer readable memory and comprising a series of instructions for:
gathering pixel intensities of post-images in one time frame derived from the signal captured after use of a contrast agent and pixel intensities of a pre-image derived from the signal captured before use of the contrast agent;
subtracting the pixel intensities of the pre-image from the pixel intensities of the post-images in one time frame to obtain pixel intensities of a subtraction image;
selecting a region of interest that surrounds the lesion;
setting a landmark within the region of interest;

starting with level $I=I(L)$ and decrementing I at each step, constructing the cluster of pixels that are M-connected to L, where M is an integer multiple of 2, depending on the number of dimensions reflected in the image, and have intensity level$>=I$, where $I(L)$ denotes the pixel intensity at the landmark such that the clusters form a monotonically increasing set $\{C_N, C_{N-1}, \ldots\}$, with Function$(C_N)<=$Function$(C_{N-1})<=\ldots$, where the Function depends at least in part on the number of dimensions reflected in the image, and continuing this process until intensity level equals II, where Function$(C_{II})>=Q$, where Q is predetermined value;

starting with level $J=II$ and decrementing by J at each step, computing a mean gradient on the border of $C_J$ (MeanGrad(J)) using data from the post-images in one time frame where the intensity level at which MeanGrad is maximum defines level $I_{max}$;

setting $I_{min}$ as a highest intensity level for which the area of $C_{Imin}$ exceeds the area of $C_{Imax}$ multiplied by some predetermined value, Function$(C_{Imin})>N*$Function$(C_{Imax})$;

starting with level $I=I_{max}$ and decrementing through $I=I_{min}$, constructing a minimum bounding box $B_I$ around $C_I$ and computing the Functions of the boxes, $B_{Imax} \subseteq B_{Imax-1} \subseteq \ldots$, with Function$(B_{Imax}) \leq$ Function$(B_{Imax-1}) \leq \ldots$;

incrementing a step counter each time that a decrement in intensity level induces a change in the Function characteristic of the minimum bounding box;

outputting a total number of steps when $B(J)>B$(previous bounding box); and determining whether the lesion is more likely to be benign, cancerous or uncertain based on the total number of steps, or based on threshold values and locations of pixels depicting a plurality of lesions within the body region.

* * * * *